US012576529B2

(12) United States Patent (10) Patent No.: US 12,576,529 B2

Yoneyama (45) Date of Patent: Mar. 17, 2026

(54) ROBOT SIMULATION DEVICE

(71) Applicant: FANUC CORPORATION, Minamitsuru-gun (JP)

(72) Inventor: Hiroyuki Yoneyama, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 209 days.

(21) Appl. No.: 18/288,416

(22) PCT Filed: May 31, 2021

(86) PCT No.: PCT/JP2021/020720

§ 371 (c)(1),
(2) Date: Oct. 26, 2023

(87) PCT Pub. No.: WO2022/254538

PCT Pub. Date: Dec. 8, 2022

(65) Prior Publication Data

US 2024/0139952 A1 May 2, 2024

(51) Int. Cl.
*B25J 9/16* (2006.01)

(52) U.S. Cl.
CPC .................................. *B25J 9/1671* (2013.01)

(58) Field of Classification Search
CPC ..... B25J 9/1671; B25J 9/00; B25J 9/16; B25J 9/1656; B25J 9/1661; B25J 9/1664; B25J 9/1605; G05B 19/41885; G05B 19/4069
See application file for complete search history.

(56) References Cited

U.S. PATENT DOCUMENTS 9,840,007 B1* 12/2017 Kuffner ................. B25J 9/1671
11,787,055 B2* 10/2023 Gienger ................. B25J 9/1666
700/245

(Continued)

FOREIGN PATENT DOCUMENTS

JP 62-92003 4/1987
JP 63-267183 11/1988

(Continued)

OTHER PUBLICATIONS

International Search Report (ISR) issued Aug. 10, 2021 in International (PCT) Application No. PCT/JP2021/020720.

*Primary Examiner* — Adam R Mott
*Assistant Examiner* — Byron Xavier Kasper
(74) *Attorney, Agent, or Firm* — Wenderoth, Lind & Ponack, L.L.P.

(57) ABSTRACT

During or after a simulation, a change in robot operation and cycle time before and after revision of a robot program, or a difference in the robot operation and cycle time between multiple robot programs, the contents of which are partially different, are compared. This robot simulation device has a three-dimensional model arrangement unit that arranges in a virtual space a robot model representing a robot, a simulation execution unit that executes a simulation with a robot program and operates a robot model, an operation log storage unit that stores the position/orientation of the robot model at each time point as an operation log, and an operation log reproduction unit that selects one or more operation logs, arranges in the virtual space an operation log reproduction robot model representing the robot, and operates the operation log reproduction robot model based on time points stored in the selected operation log(s).

2 Claims, 21 Drawing Sheets

(56) References Cited

U.S. PATENT DOCUMENTS

| | | | | |
|---|---|---|---|---|
| 2009/0089030 A1* | 4/2009 | Sturrock | ................ | G05B 17/02 |
| | | | | 703/7 |
| 2020/0101599 A1* | 4/2020 | Yoshida | ................ | B25J 9/1697 |
| 2022/0111517 A1* | 4/2022 | Bennice | ................ | B25J 9/1605 |

FOREIGN PATENT DOCUMENTS

| | | | | |
|---|---|---|---|---|
| JP | 2008-100315 A | 5/2008 | | |
| JP | 2016-129915 | 7/2016 | | |
| JP | 2017-102620 | 6/2017 | | |
| JP | 2018-47509 | 3/2018 | | |
| JP | 2021-20285 | 2/2021 | | |
| WO | 2019/064916 | 4/2019 | | |
| WO | WO-2021254715 A1 * | 12/2021 | ........... | G05B 19/056 |

* cited by examiner

FIG. 4A

MOTION PATH

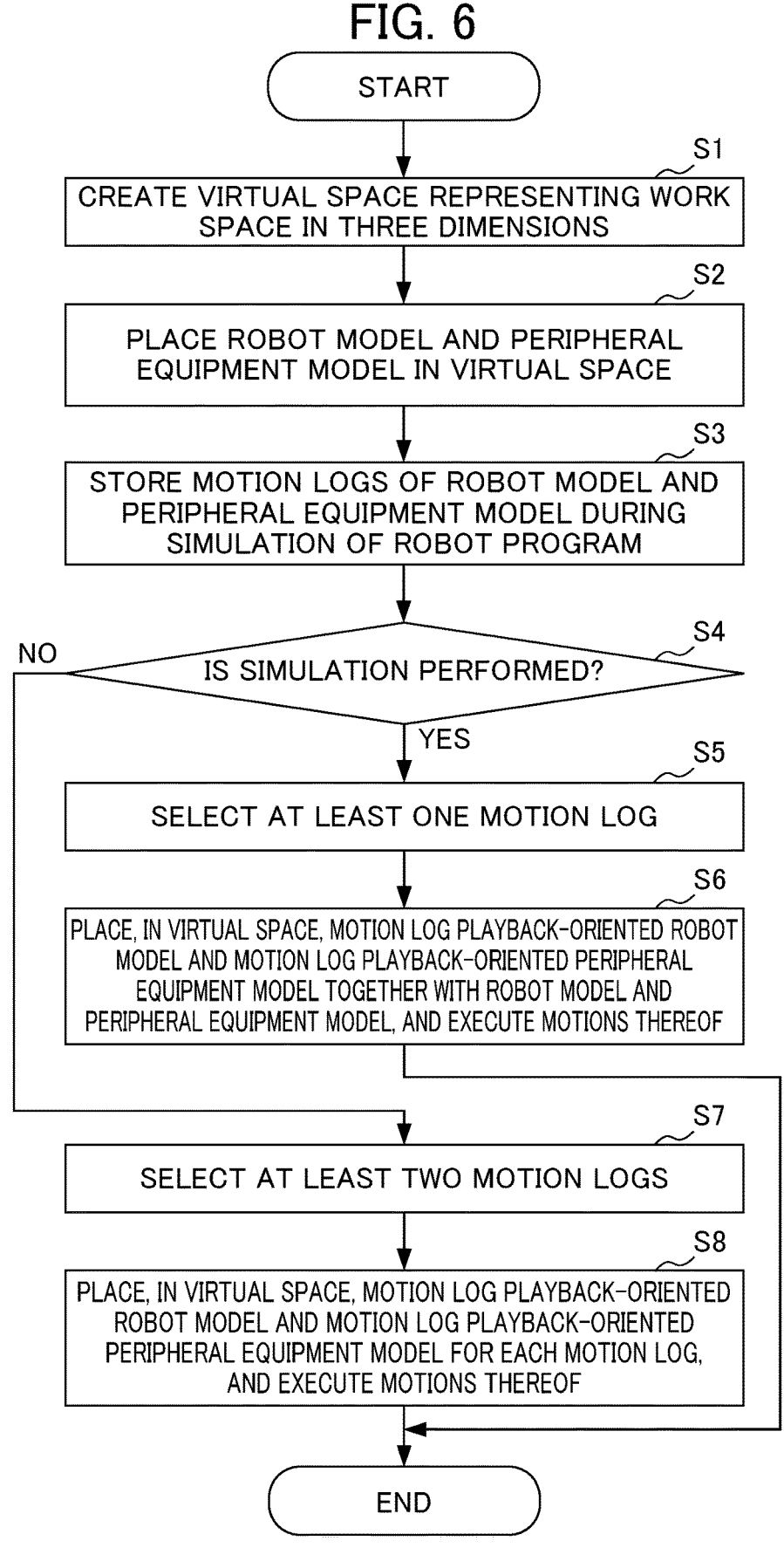

START

S1
CREATE VIRTUAL SPACE REPRESENTING WORK SPACE IN THREE DIMENSIONS

S2
PLACE ROBOT MODEL AND PERIPHERAL EQUIPMENT MODEL IN VIRTUAL SPACE

S3
STORE MOTION LOGS OF ROBOT MODEL AND PERIPHERAL EQUIPMENT MODEL DURING SIMULATION OF ROBOT PROGRAM

S4
IS SIMULATION PERFORMED?

NO

YES

S5
SELECT AT LEAST ONE MOTION LOG

S6
PLACE, IN VIRTUAL SPACE, MOTION LOG PLAYBACK-ORIENTED ROBOT MODEL AND MOTION LOG PLAYBACK-ORIENTED PERIPHERAL EQUIPMENT MODEL TOGETHER WITH ROBOT MODEL AND PERIPHERAL EQUIPMENT MODEL, AND EXECUTE MOTIONS THEREOF

S7
SELECT AT LEAST TWO MOTION LOGS

S8
PLACE, IN VIRTUAL SPACE, MOTION LOG PLAYBACK-ORIENTED ROBOT MODEL AND MOTION LOG PLAYBACK-ORIENTED PERIPHERAL EQUIPMENT MODEL FOR EACH MOTION LOG, AND EXECUTE MOTIONS THEREOF

END

ROBOT SIMULATION DEVICE

TECHNICAL FIELD

The present invention relates to a robot simulation device.

BACKGROUND ART

A technology has been proposed to place and simultaneously display, on a screen, three-dimensional models of a robot system including a tool-equipped robot, a workpiece, and peripheral equipment, and thus run a simulation of operation of a robot program on a computer. See, for example, Patent Document 1.

Patent Document 1: Japanese Unexamined Patent Application, Publication No. 2016-129915

DISCLOSURE OF THE INVENTION

Problems to be Solved by the Invention

However, in some cases, it is difficult to compare, during or after execution of a simulation, change of motions of a robot or cycle times before and after an adjustment of a teaching position or the like in a robot program to determine a change therebetween, or difference of motions of a robot or cycle times in a plurality of robot programs that have partially different content to determine a difference therebetween.

It is therefore desirable to easily compare, during or after execution of a simulation, motions of a robot or cycle times before and after an adjustment in a robot program to determine a change therebetween, or motions of a robot or cycle times in a plurality of robot programs that have partially different content to determine a difference therebetween.

Means for Solving the Problems

One aspect of the robot simulation device of the present disclosure is a robot simulation device for performing a simulation of a robot program in a robot system including a robot, the robot simulation device including: a three-dimensional model placement unit configured to place, in a virtual space, a robot model representing the robot in three dimensions; a simulation execution unit configured to execute a motion of the robot model while performing a simulation of each robot program; a motion log storage unit configured to store, as a motion log, positions and orientations of the robot model at different points in time during the simulation of the robot program; and a motion log playback unit configured to select at least one of the plurality of motion logs stored in the motion log storage unit, additionally place a motion log playback-oriented robot model in the virtual space, and execute a motion of the motion log playback-oriented robot model based on the points in time contained in the selected motion log, the motion log playback-oriented robot model representing the robot in three dimensions.

Effects of the Invention

According to the foregoing aspect, it is possible to easily compare, during or after execution of a simulation, motions of a robot or cycle times before and after an adjustment in a robot program to determine a change therebetween, or motions of a robot or cycle times in a plurality of robot programs that have partially different content to determine a difference therebetween.

BRIEF DESCRIPTION OF THE DRAWINGS

FIG. 4A is a diagram showing an example of an image of the robot system in a case where a simulation execution unit re-performs a simulation of a robot program of interest or another robot program;

FIG. 6 is a flowchart for describing simulation processing in the robot simulation device;

PREFERRED MODE FOR CARRYING OUT
THE INVENTION

Embodiment

The following describes a configuration of an embodiment in detail with reference to the drawings. The present embodiment is described using, as an example, a case where a robot having a hand attached thereto is mounted on a rail axis, which is peripheral equipment, and grips and moves a workpiece in a virtual space representing a work space. It should be noted that the present invention is also applicable to other cases such as where a robot grips and moves a workpiece without being mounted on a rail axis, or where a robot performs machining of a workpiece.

Figure 1:
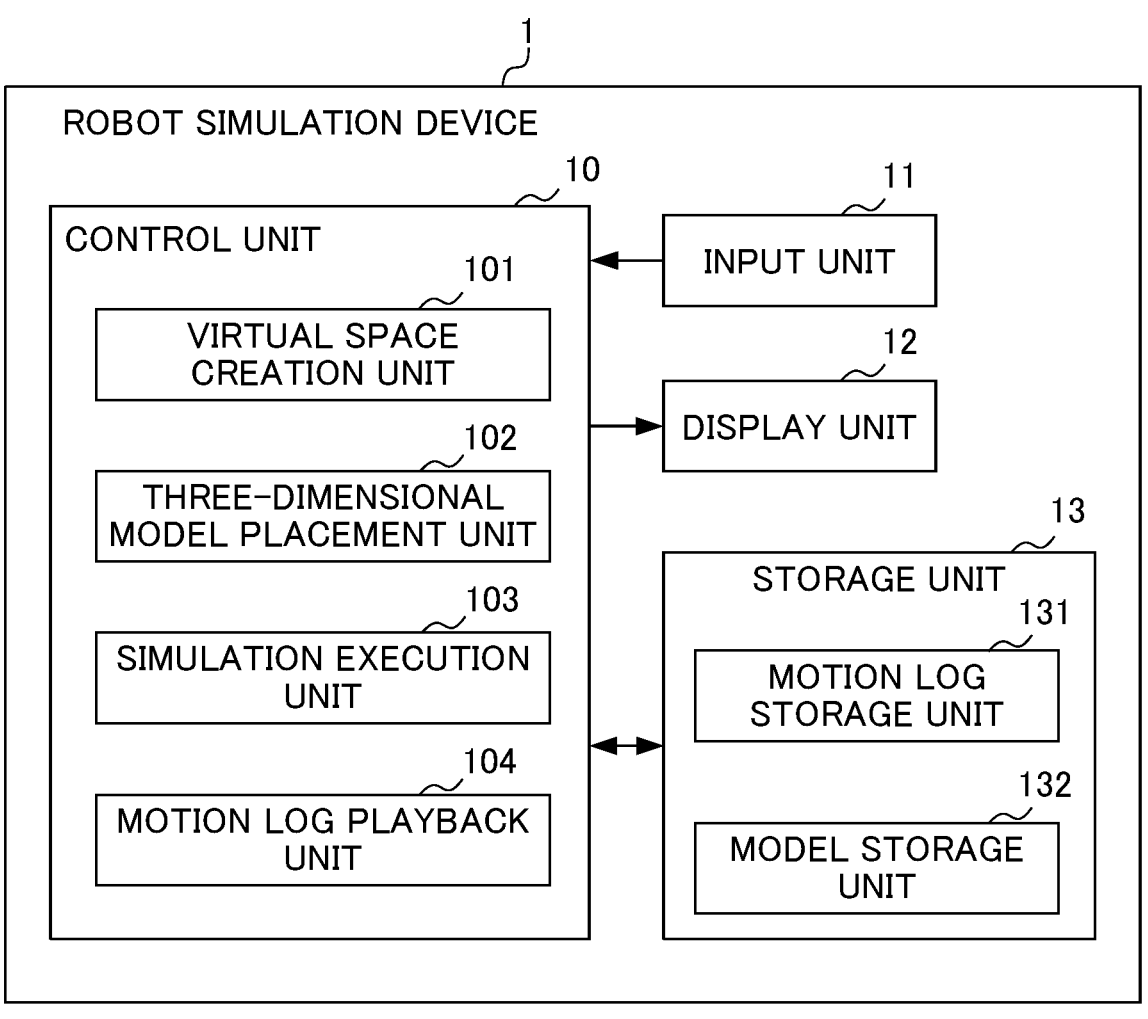
FIG. 1 is a functional block diagram illustrating an example of a functional configuration of a robot simulation device according to an embodiment.

FIG. 1 is a functional block diagram illustrating an example of a functional configuration of a robot simulation device according to the present embodiment.

A robot simulation device 1 is a known computer, and includes a control unit 10, an input unit 11, a display unit 12, and a storage unit 13 as illustrated in FIG. 1. The control unit 10 includes a virtual space creation unit 101, a three-dimensional model placement unit 102, a simulation execution unit 103, and a motion log playback unit 104. The storage unit 13 includes a motion log storage unit 131 and a model storage unit 132.

The robot simulation device 1 may be connected to a robot control device (not shown) that controls operation of a robot (not shown) and a control device (not shown) that controls operation of a rail axis (not shown) via a network such as a local area network (LAN) or the Internet. Alternatively, the robot simulation device 1 may be directly connected to the robot control device (not shown) and the control device (not shown) through connection interfaces, not shown.

<Input Unit 11>

The input unit 11 is, for example, a keyboard or a touch panel provided on the display unit 12, which is described below, and receives input from an operator.

<Display Unit 12>

The display unit 12 is, for example, a liquid crystal display. As described below, the display unit 12 displays, for example, data inputted (selected) by an operator or another user through the input unit 11, such as three-dimensional CAD data representing in three dimensions a robot (not shown) having a hand or the like attached thereto (also referred to below as "robot model"), three-dimensional CAD data representing in three dimensions a rail axis, which is peripheral equipment, for mounting the robot thereon (also referred to below as "peripheral equipment model"), and three-dimensional CAD data of, for example, a jig and a workpiece to be gripped by the robot (not shown).

<Storage Unit 13>

The storage unit 13 is, for example, a solid state drive (SSD) or a hard disk drive (HDD), and may store therein various robot programs and the like for executing motions of the robot and the peripheral equipment, not shown, so that the robot grips and moves a workpiece or the like.

The motion log storage unit 131 stores therein motion logs on a per-robot program basis. As described below, the simulation execution unit 103 executes motions of the robot model and the peripheral equipment model while performing a simulation of each robot program. The motion log storage unit 131 stores, as a motion log, positions and orientations of the robot model and the peripheral equipment model at different points in time during the simulation of each robot program.

The model storage unit 132 stores, for example, data inputted (selected) by the user through the input unit 11 and displayed on the display unit 12, such as three-dimensional CAD data (robot model) of the robot (not shown), three-dimensional CAD data (peripheral equipment model) of the peripheral equipment (not shown), and three-dimensional CAD data of, for example, the workpiece and the jig (not shown) as described above.

<Control Unit 10>

The control unit 10 includes, for example, a central processing unit (CPU), read only memory (ROM), random access memory (RAM), and complementary metal-oxide-semiconductor (CMOS) memory, which are known to those skilled in the art and are configured to communicate with each other via a bus.

The CPU is a processor that performs overall control of the robot simulation device 1. The CPU reads a system program and an application program stored in the ROM via the bus, and performs overall control of the robot simulation device 1 in accordance with the system program and the application program. Thus, as shown in FIG. 1, the control unit 10 is configured to implement the functions of the virtual space creation unit 101, the three-dimensional model placement unit 102, the simulation execution unit 103, and the motion log playback unit 104. The RAM stores therein various data such as temporary calculation data and display data. The CMOS memory is backed up by a battery, not shown, and is configured as nonvolatile memory that retains stored information even when the robot simulation device 1 is turned off.

The virtual space creation unit 101 creates a virtual space representing in three dimensions a work space in which the robot (not shown), the peripheral equipment (not shown), the workpiece and the jig (not shown), and the like are placed.

In accordance with an input operation by the user through the input unit 11, for example, the three-dimensional model placement unit 102 places the robot model of the robot (not shown), the peripheral equipment model of the peripheral equipment (not shown), and the models (for example, three-dimensional CAD data) of the workpiece, the jig, and the like in the three-dimensional virtual space created by the virtual space creation unit 101.

Specifically, in order to place the robot, not shown, in the virtual space, the three-dimensional model placement unit 102 reads the robot model of the robot from the model storage unit 132. The three-dimensional model placement unit 102 places the read robot model in the virtual space.

In order to place the peripheral equipment model of the rail axis, not shown, in the virtual space, the three-dimensional model placement unit 102 also reads the peripheral equipment model of the rail axis from the model storage unit 132. The three-dimensional model placement unit 102 places the read peripheral equipment model of the rail axis in the virtual space.

In order to place the models (three-dimensional CAD models) of the workpiece, the jig, and the like, not shown, in the virtual space, the three-dimensional model placement unit 102 also reads the models (three-dimensional CAD models) of the workpiece, the jig, and the like from the model storage unit 132. The three-dimensional model placement unit 102 places the read models (three-dimensional CAD models) of the workpiece, the jig, and the like in the virtual space.

Figure 2:
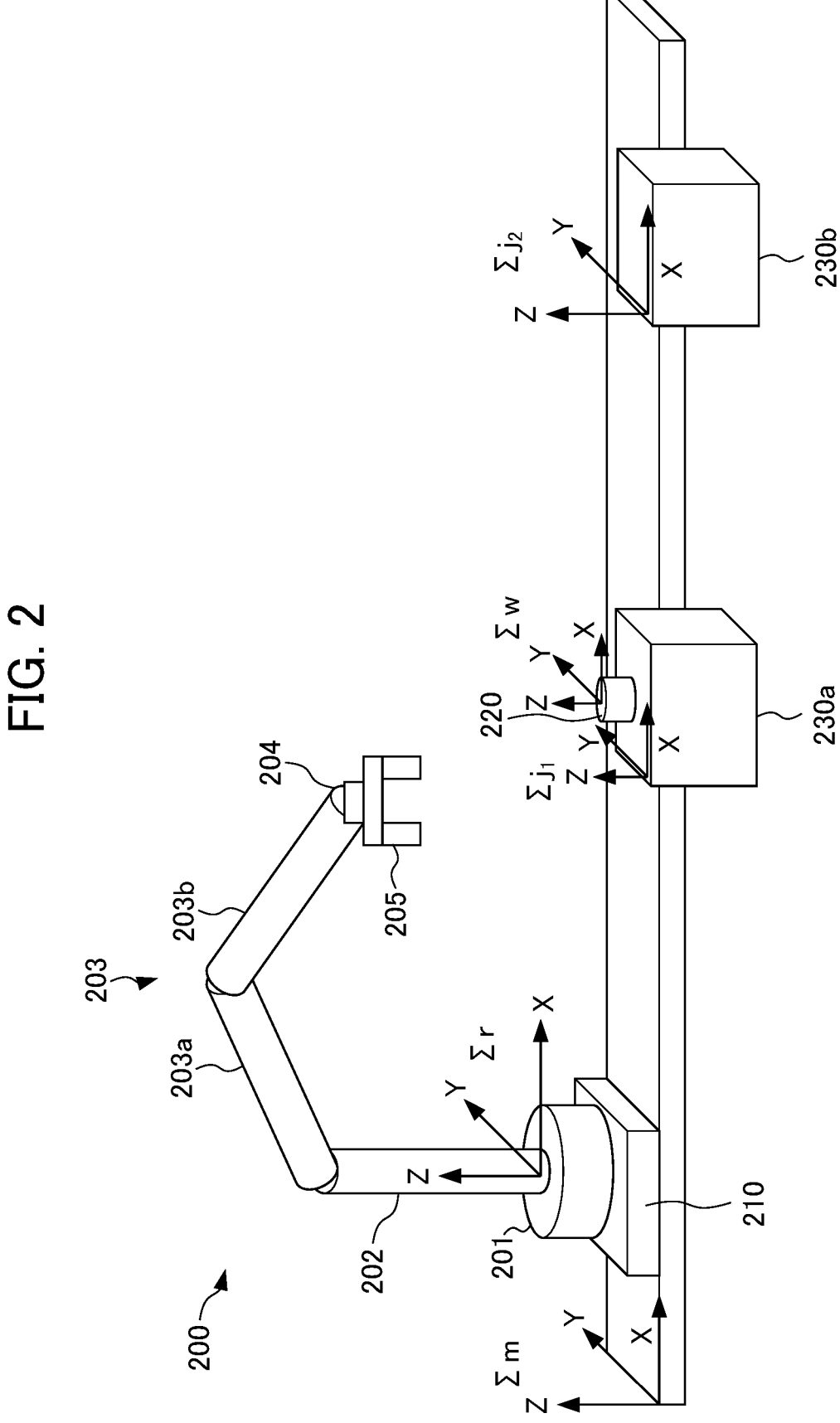
FIG. 2 is a diagram showing an example of an image of a robot system placed by a three-dimensional model placement unit.

FIG. 2 is a diagram showing an example of an image of a robot system placed by the three-dimensional model placement unit 102.

As shown in FIG. 2, a robot model 200, a peripheral equipment model 210, a workpiece model 220, and jig models 230*a* and 230*b* are placed in a virtual space in the image generated.

The robot model 200 is a three-dimensional model of a vertical articulated robot that grips and moves a workpiece. The robot model 200 is mounted on the peripheral equipment model 210 representing a rail axis, and has a robot base model 201, a rotary body model 202, a robot arm model 203, and a wrist model 204.

The robot arm model 203 includes an upper arm model 203*a* rotatably connected to the rotary body model 202 and a forearm model 203*b* rotatably connected to the distal end of the upper arm model 203*a*.

The wrist model 204 is located at the distal end of the forearm model 203*b* in the virtual space and is provided with, for example, a three-dimensional CAD model 205 of a hand (also referred to below as "hand model").

Each robot program for the robot has virtual robot motion parameters for executing motions of the robot model 200 and the peripheral equipment model 210. The virtual robot motion parameters include, for example, an origin and axial directions of a robot coordinate system $\Sigma r$, a peripheral equipment coordinate system $\Sigma m$ of the rail axis, an origin and axial directions of a workpiece coordinate system $\Sigma w$, origins and axial directions of jig coordinate systems $\Sigma j_1$ and $\Sigma j_2$, maximum drive speeds of the robot and the rail axis, and a virtual motion range.

The robot coordinate system $\Sigma r$ is used as a reference when a motion of the robot model 200 is executed in the virtual space. The robot coordinate system $\Sigma r$ is defined in the virtual space using the origin and the axial directions of the robot coordinate system $\Sigma r$ that are included in the virtual robot motion parameters.

As shown in FIG. 2, the origin of the robot coordinate system $\Sigma r$ is located at the center of the robot base model 201, and the rotary body model 202 rotates around the Z-axis of the robot coordinate system $\Sigma r$.

The peripheral equipment coordinate system $\Sigma m$ specifies the position and the orientation of the peripheral equipment model 210 in the virtual space. The peripheral equipment coordinate system $\Sigma m$ is defined in the virtual space using the origin and the axial directions of the peripheral equipment coordinate system $\Sigma m$ that are included in the virtual robot motion parameters.

The workpiece coordinate system $\Sigma w$ specifies the position and the orientation of the workpiece model 220 in the virtual space. The workpiece coordinate system $\Sigma w$ is defined in the virtual space using the origin and the axial directions of the workpiece coordinate system $\Sigma w$ that are included in the virtual robot motion parameters.

The jig coordinate systems $\Sigma j_1$ and $\Sigma j_2$ specify the position and the orientation of the jig models 230*a* and 230*b* in the virtual space. The jig coordinate systems $\Sigma j_1$ and $\Sigma j_2$ are defined in the virtual space using the origins and the axial directions of the jig coordinate systems $\Sigma j_1$ and $\Sigma j_2$ that are included in the virtual robot motion parameters.

As shown in FIG. 2, the origin of the peripheral equipment coordinate system $\Sigma m$ coincides with an end point of the peripheral equipment model 210 of the rail axis, and the peripheral equipment model 210 moves in the X-axis direction of the peripheral equipment coordinate system $\Sigma m$.

The origin of the workpiece coordinate system $\Sigma w$ is, for example, located on the top surface of the workpiece model 220. The axial directions of the workpiece coordinate system $\Sigma w$ are set so that the X-axis is the moving direction of the rail axis and the Z-axis is a direction vertical to the top surface of the workpiece model 220. The origins of the jig coordinate systems $\Sigma j_1$ and $\Sigma j_2$ are located on the top surfaces of the jig models 230*a* and 230*b*, respectively. The axial directions of the jig coordinate systems $\Sigma j_1$ and $\Sigma j_2$ are set so that the X-axes are the moving direction of the rail axis and the Z-axes are directions vertical to the top surfaces of the jig models 230*a* and 230*b*.

The above-described configuration allows the robot simulation device 1 to control the position of a tool center point of the hand model 205 by executing a robot program to, for example, move the workpiece model 220 from the jig model 230*a* to the jig model 230*b*.

The simulation execution unit 103 executes motions of the robot model 200 and the peripheral equipment model 210 while performing a simulation of each robot program. The simulation execution unit 103 stores, as a motion log, positions and orientations of the robot model 200 and the peripheral equipment model 210 at different points in time during the simulation of each robot program. The simulation execution unit 103 stores such motion logs in the motion log storage unit 131 on a per-robot program basis.

It should be noted that the simulation execution unit 103 may generate an image of the robot system operating on the robot simulation device 1 in accordance with the robot program.

Figure 3A:
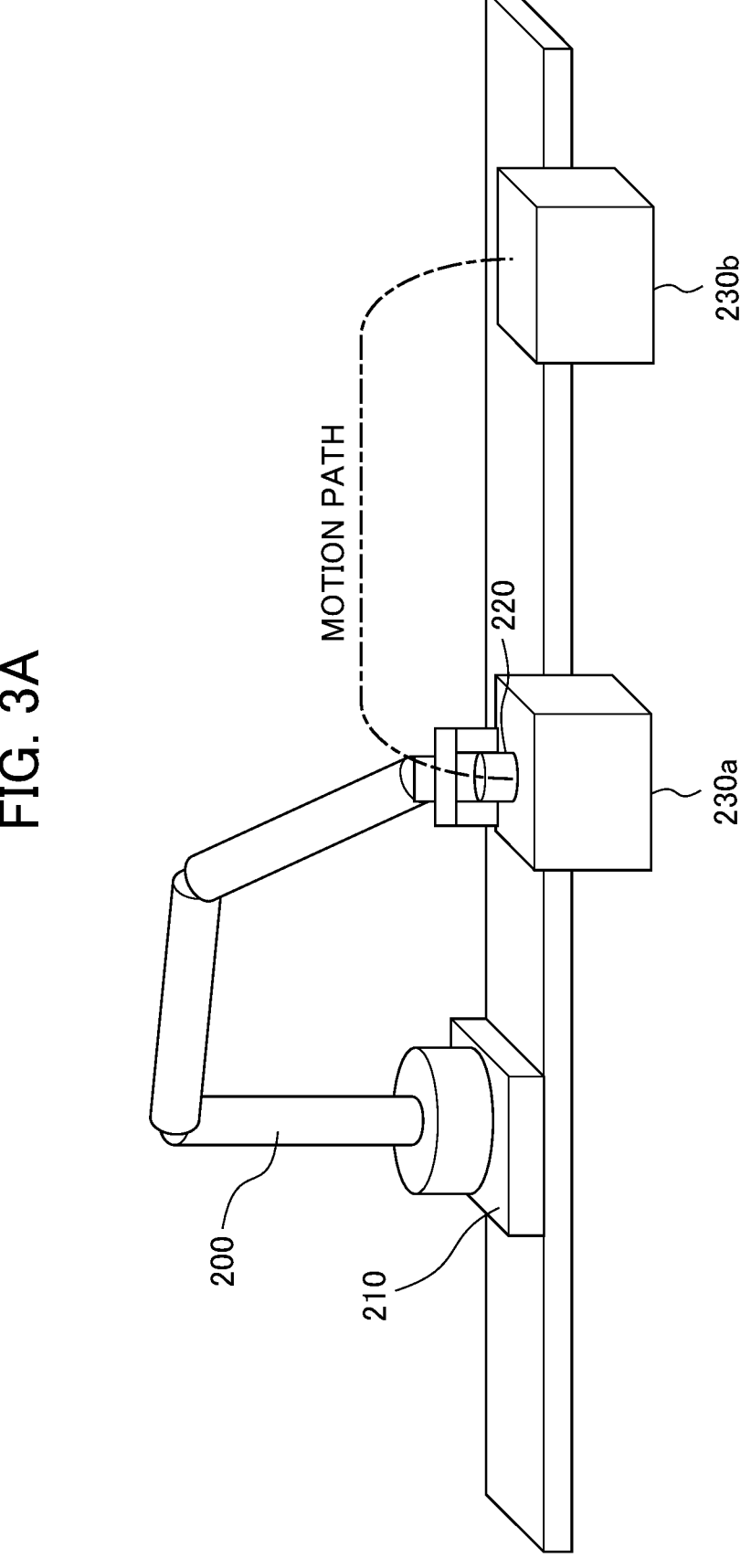
FIG. 3A is a diagram showing an example of a generated image of the robot system.
Figure 3B:
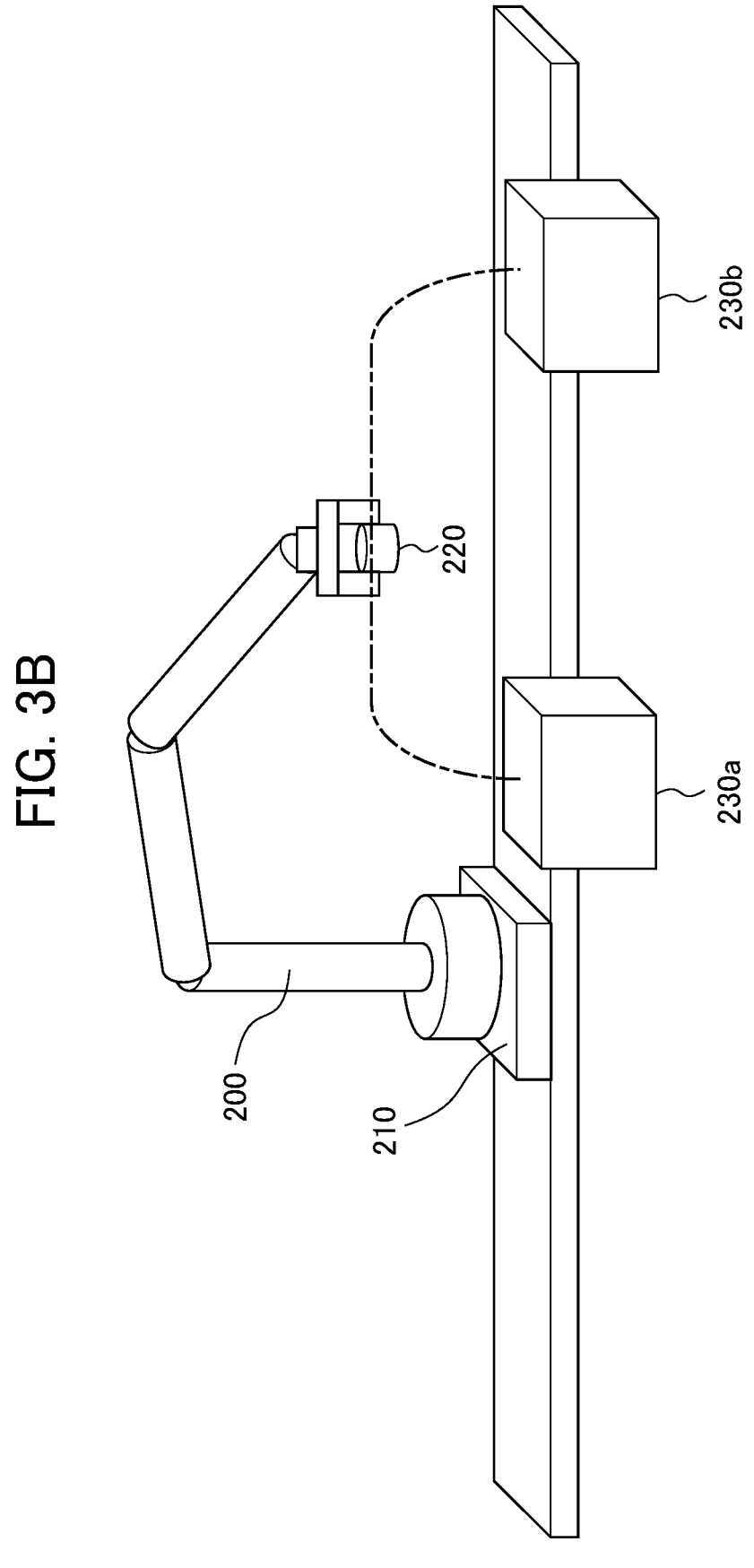
FIG. 3B is a diagram showing the example of the generated image of the robot system.
Figure 3C:
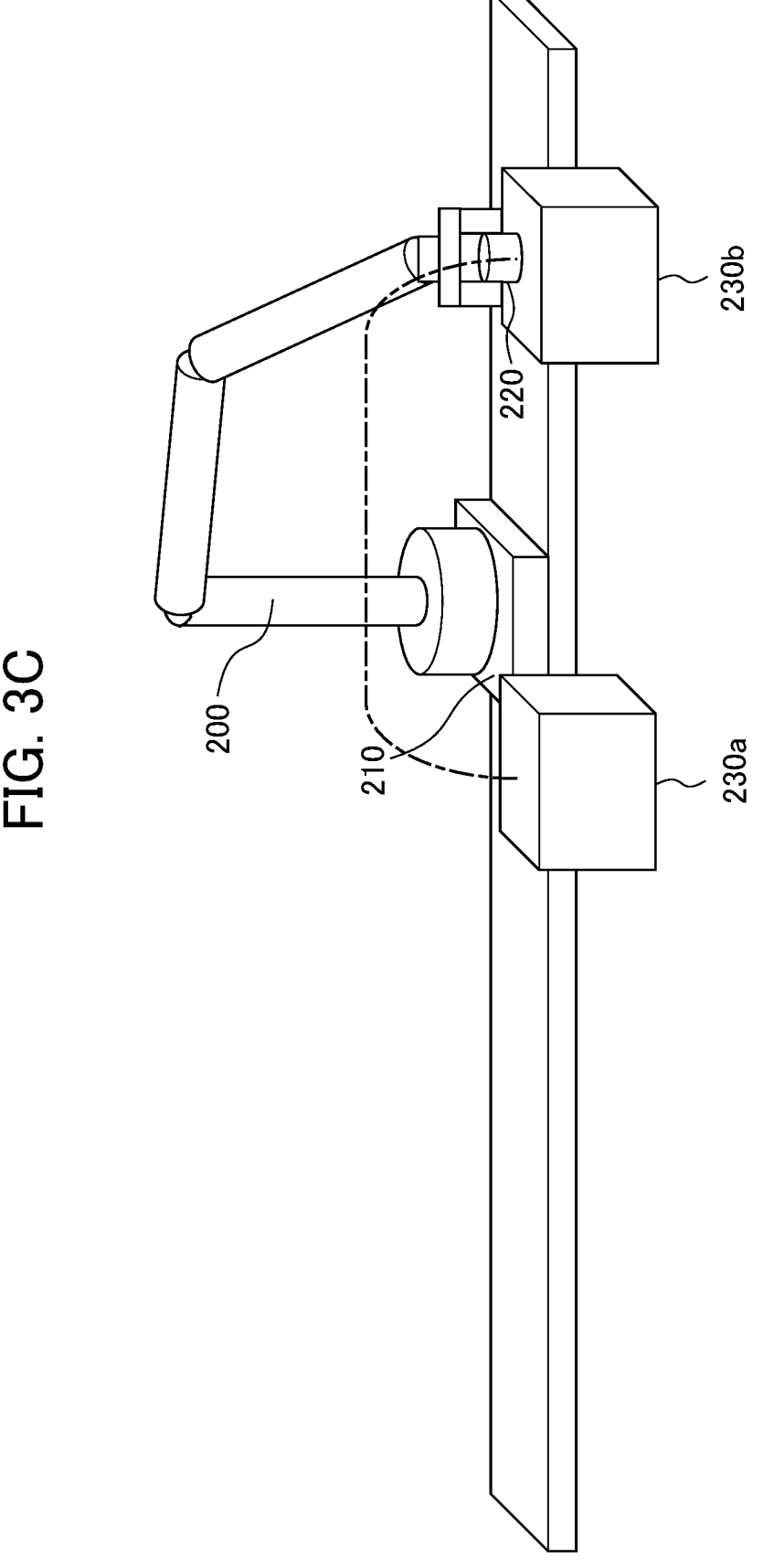
FIG. 3C is a diagram showing the example of the generated image of the robot system.

FIGS. 3A to 3C are diagrams showing an example of the generated image of the robot system. The image shown in FIGS. 3A to 3C represents a case where the robot system is handling the workpiece model 220 using the hand model 205 of the robot model 200 while moving the peripheral equipment model 210 of the rail axis.

The simulation execution unit 103 may display the generated image shown in FIGS. 3A to 3C on the display unit 12.

The simulation execution unit 103 may terminate the simulation when the workpiece model 220 has been moved to the jig model 230*b*. The simulation execution unit 103 may terminate the simulation by returning the robot model 200 and the peripheral equipment model 210 to a motion start position.

The motion log playback unit 104 selects at least one of the plurality of motion logs stored in the motion log storage unit 131, additionally places a motion log playback-oriented robot model, which represents the robot (not shown) in three dimensions, and a motion log playback-oriented peripheral equipment model in the virtual space, and executes motions of the motion log playback-oriented robot model and the motion log playback-oriented peripheral equipment model based on the points in time contained in the selected motion log.

Hereinafter, the operation of the motion log playback unit 104 in the following cases is described: (a) a case where the simulation execution unit 103 re-performs a simulation of the robot program of interest or another robot program; and (b) a case where the simulation execution unit 103 does not perform a simulation of the robot program of interest or another robot program.

Figure 4A:
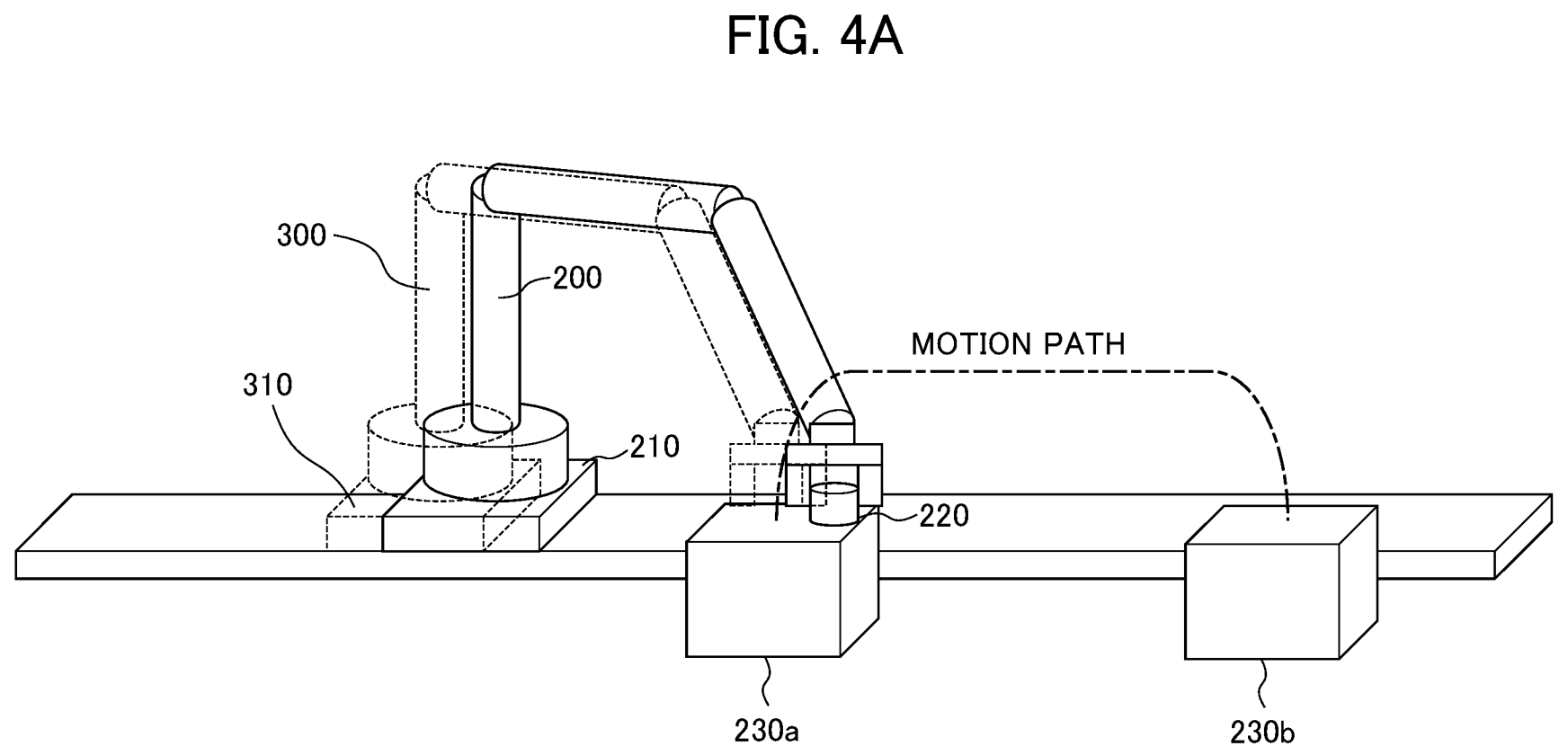
Figure 4B:
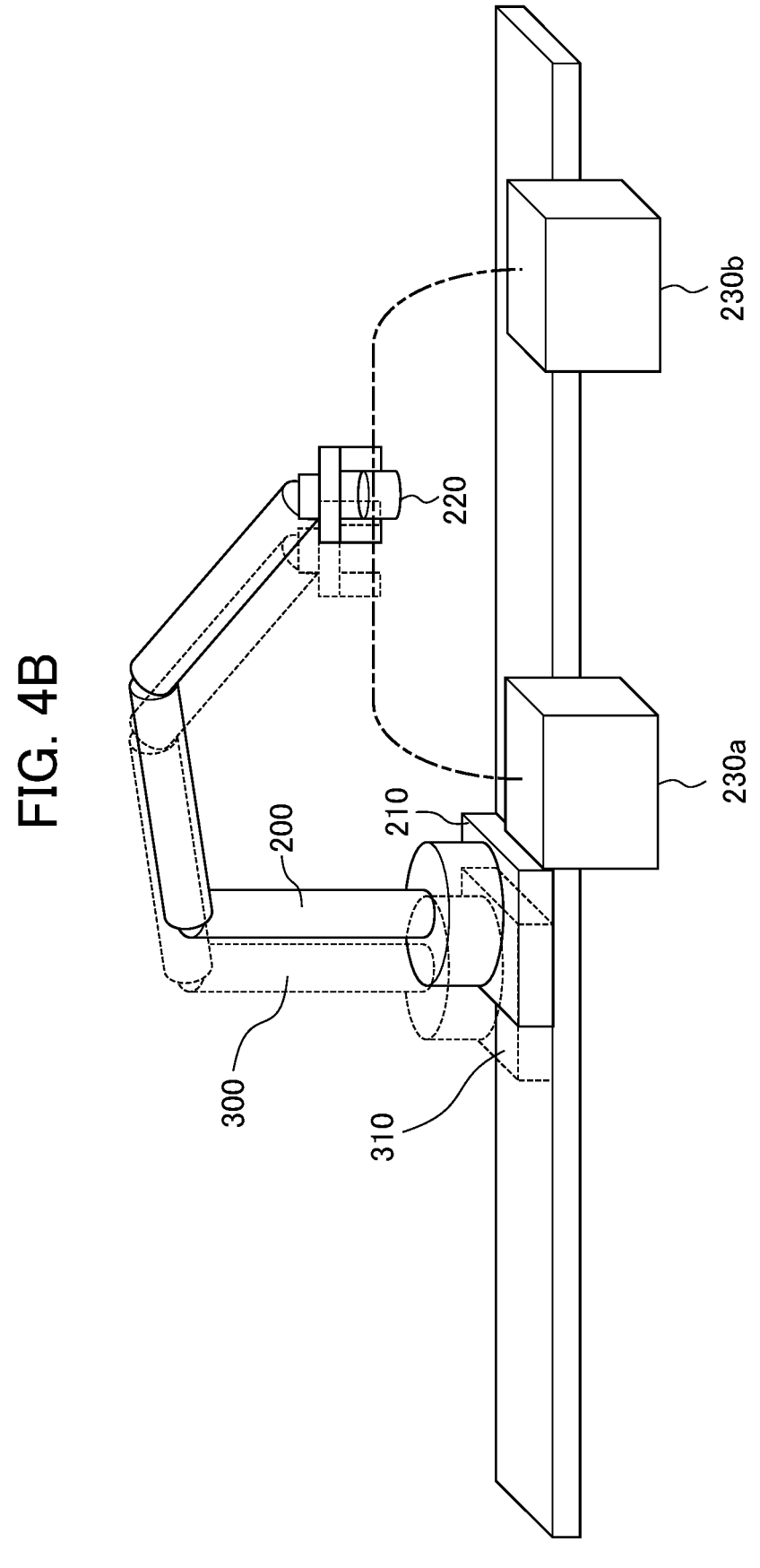
FIG. 4B is a diagram showing the example of the image of the robot system in the case where the simulation execution unit re-performs a simulation of the robot program of interest or another robot program.
Figure 4C:
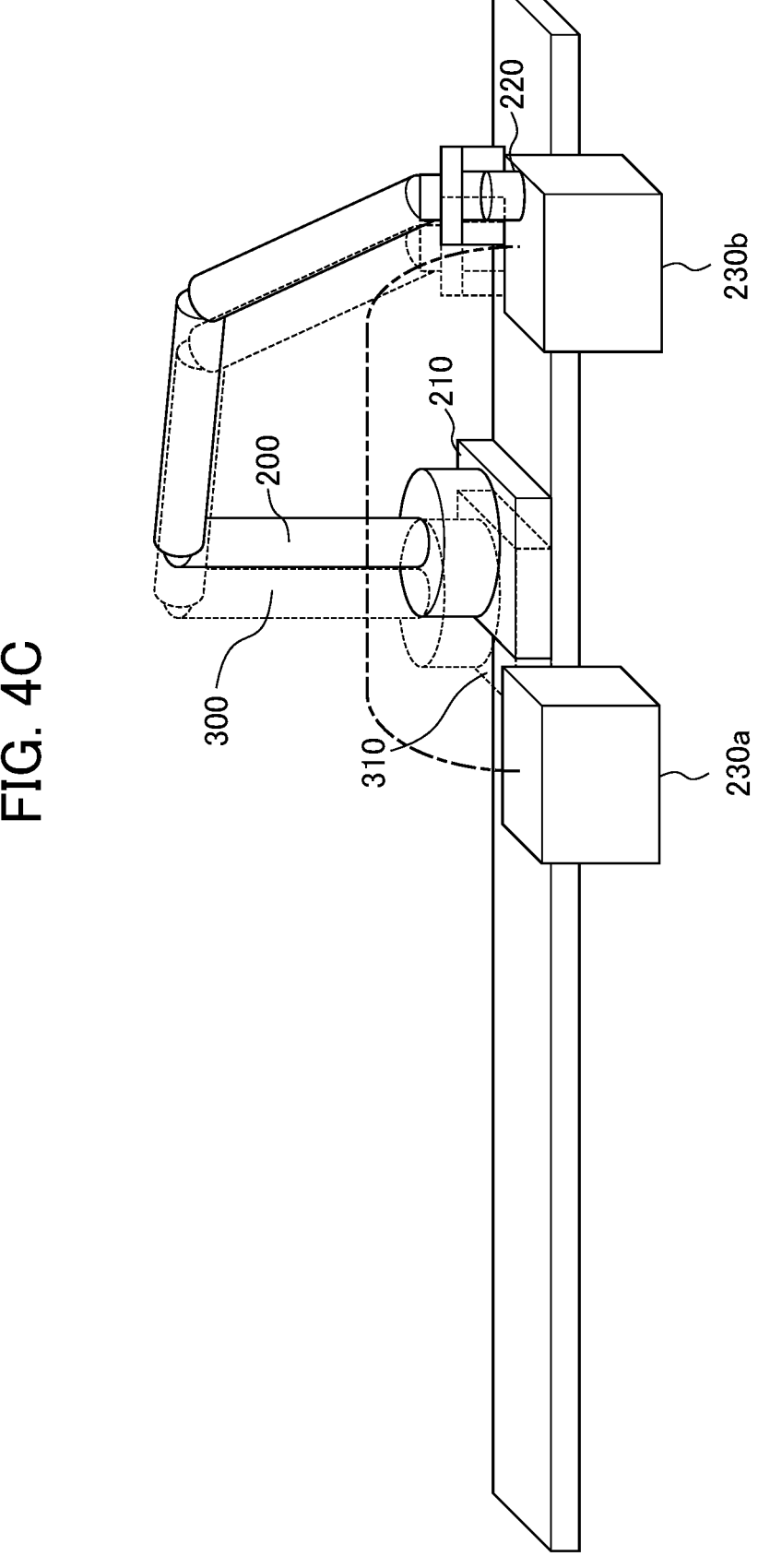
FIG. 4C is a diagram showing the example of the image of the robot system in the case where the simulation execution unit re-performs a simulation of the robot program of interest or another robot program.

(a) Case where the Simulation Execution Unit 103 Re-Performs a Simulation of the Robot Program of Interest or Another Robot Program In the case where the simulation execution unit 103 re-performs a simulation of the robot program of interest or another robot program, for example, the motion log playback unit 104 selects one of the plurality of motion logs stored in the motion log storage unit 131 based on an input operation by the user through the input unit 11. As shown in FIGS. 4A to 4C, for example, the motion log playback unit 104 places, in the virtual space, a motion log playback-oriented robot model 300 and a motion log playback-oriented peripheral equipment model 310 indicated by broken lines together with the robot model 200 and the peripheral equipment model 210 indicated by solid lines that are placed by the three-dimensional model placement unit 102 and set in motion by the simulation execution unit 103. The motion log playback unit 104 displays an image of the robot system shown in FIGS. 4A to 4C on the display unit 12. It should be noted that, in the robot program to be simulated, the positions of the motions of the robot model 200 and the peripheral equipment model 210 have been adjusted toward the positive end of the X-axis from those of the motion log playback-oriented robot model 300 and the motion log playback-oriented peripheral equipment model 310, and the position (handling position) of the workpiece model 220 has been adjusted toward the positive end of the X-axis from that in the selected motion log as shown in FIGS. 4A to 4C.

The motion log playback unit 104 executes motions of the robot model 200 and the peripheral equipment model 210, and the motion log playback-oriented robot model 300 and the motion log playback-oriented peripheral equipment model 310 by synchronizing points in time during the simulation by the simulation execution unit 103 with the points in time contained in the selected motion log.

The above-described configuration enables the robot simulation device 1 to compare, during execution of a simulation, motions of the robot or cycle times before and after an adjustment, if any, of a teaching position or the like in a robot program to determine a change therebetween, or motions of the robot or cycle times in a plurality of robot programs that have partially different content to determine a difference therebetween, while also taking into account the peripheral equipment. That is, the above-described configuration makes it possible to compare, in the robot system, motions of the robot or cycle times before and after an adjustment, if any, of a teaching position in a robot program to determine a change therebetween, or motions of the robot or cycle times in a plurality of robot programs that have partially different content to determine a difference therebetween. The user can then select a robot program that allows for optimal motions expected to result in minimizing the cycle time, eliminating unnecessary movements, and avoiding interference between the robot and the peripheral equipment or other equipment.

It should be noted that the motion log playback unit 104 may select two or more motion logs, rather than selecting one motion log as described above. In this case, the motion log playback unit 104 may place motion log playback-oriented robot models 300 and motion log playback-oriented peripheral equipment models 310 in the virtual space according to the number of selected motion logs.

Figure 5A:
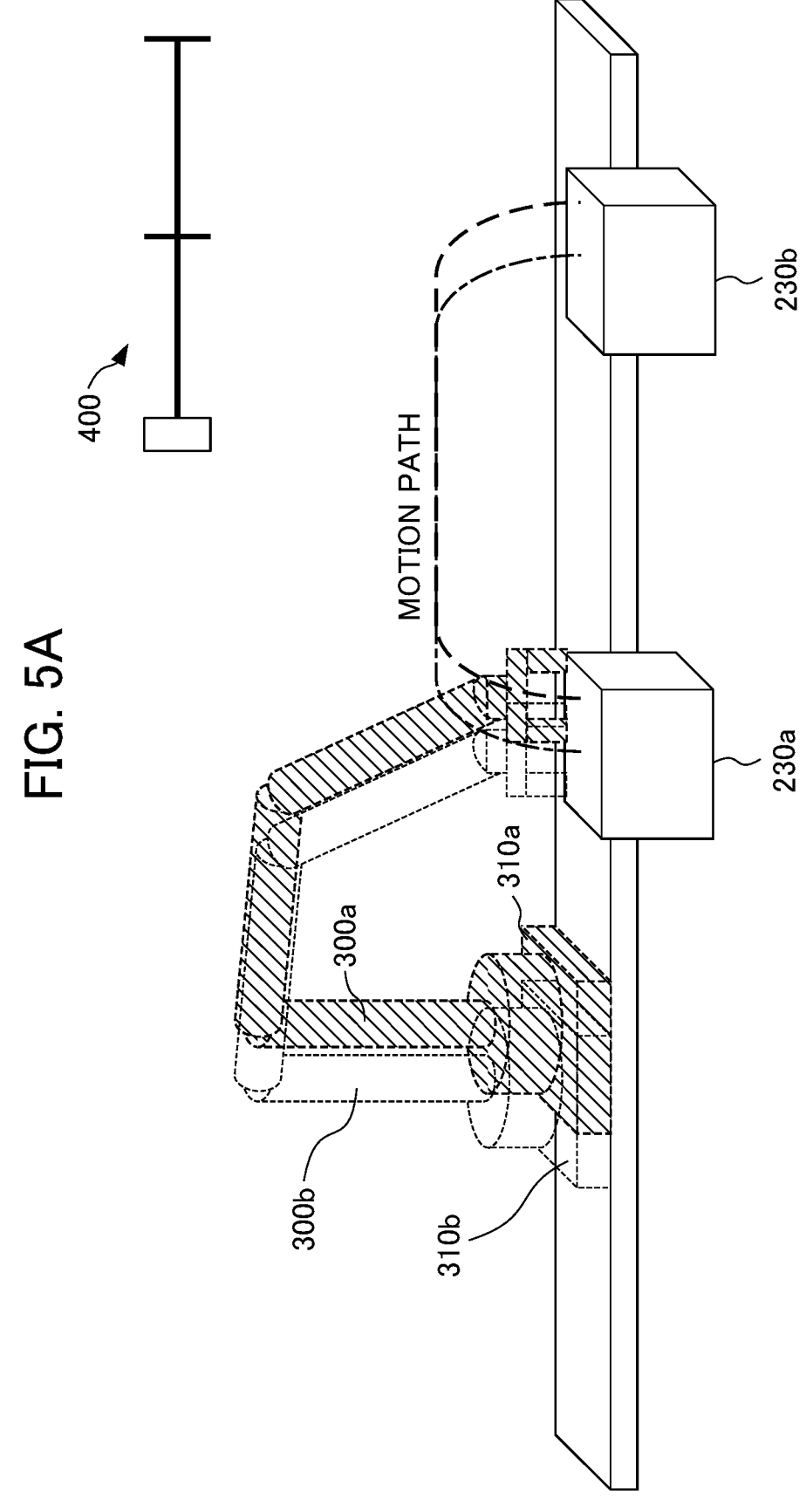
FIG. 5A is a diagram showing an example of an image of the robot system in a case where the simulation execution unit does not perform a simulation of the robot program of interest or another robot program.
Figure 5B:
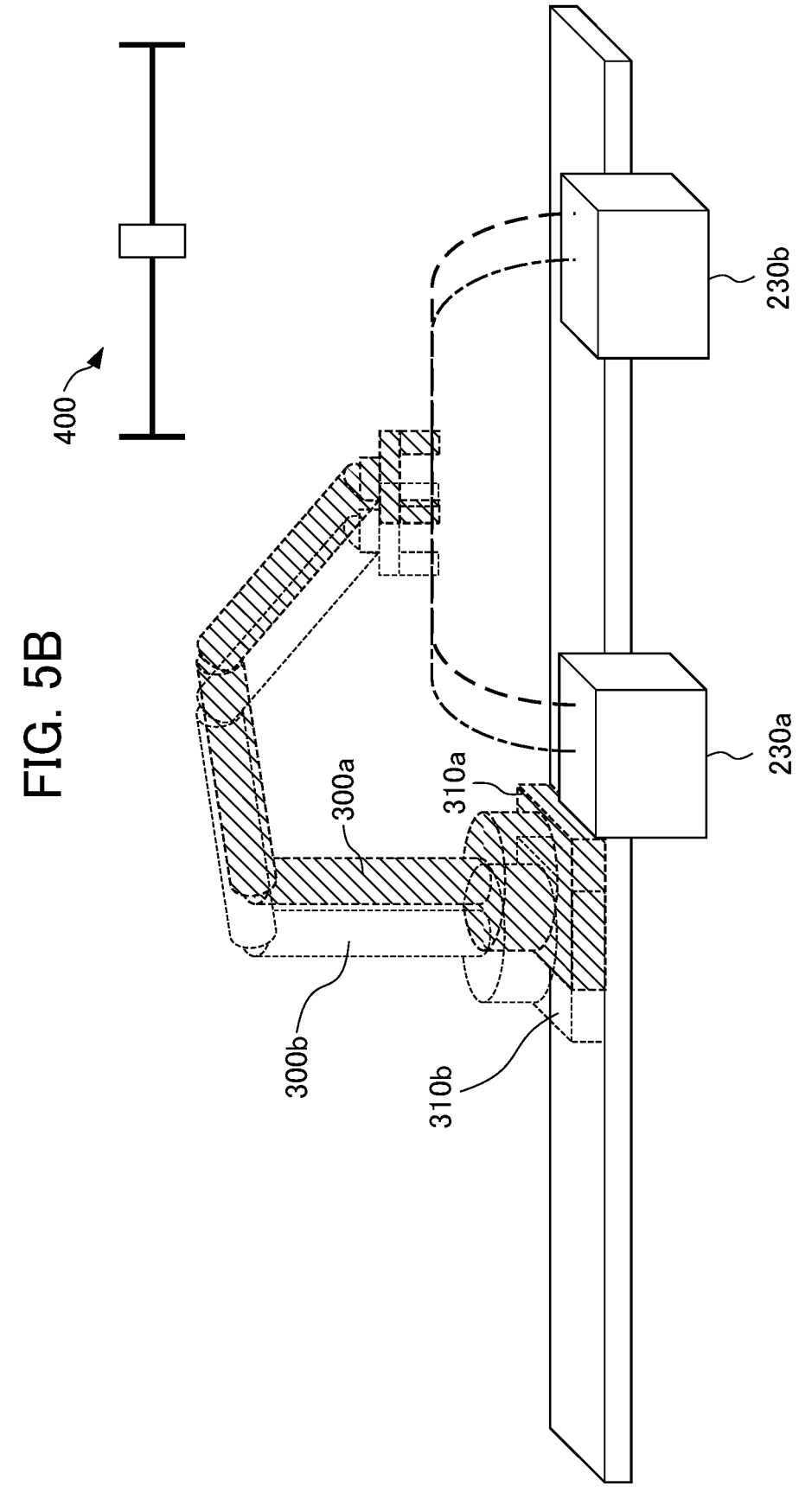
FIG. 5B is a diagram showing the example of the image of the robot system in the case where the simulation execution unit does not perform a simulation of the robot program of interest or another robot program.
Figure 5C:
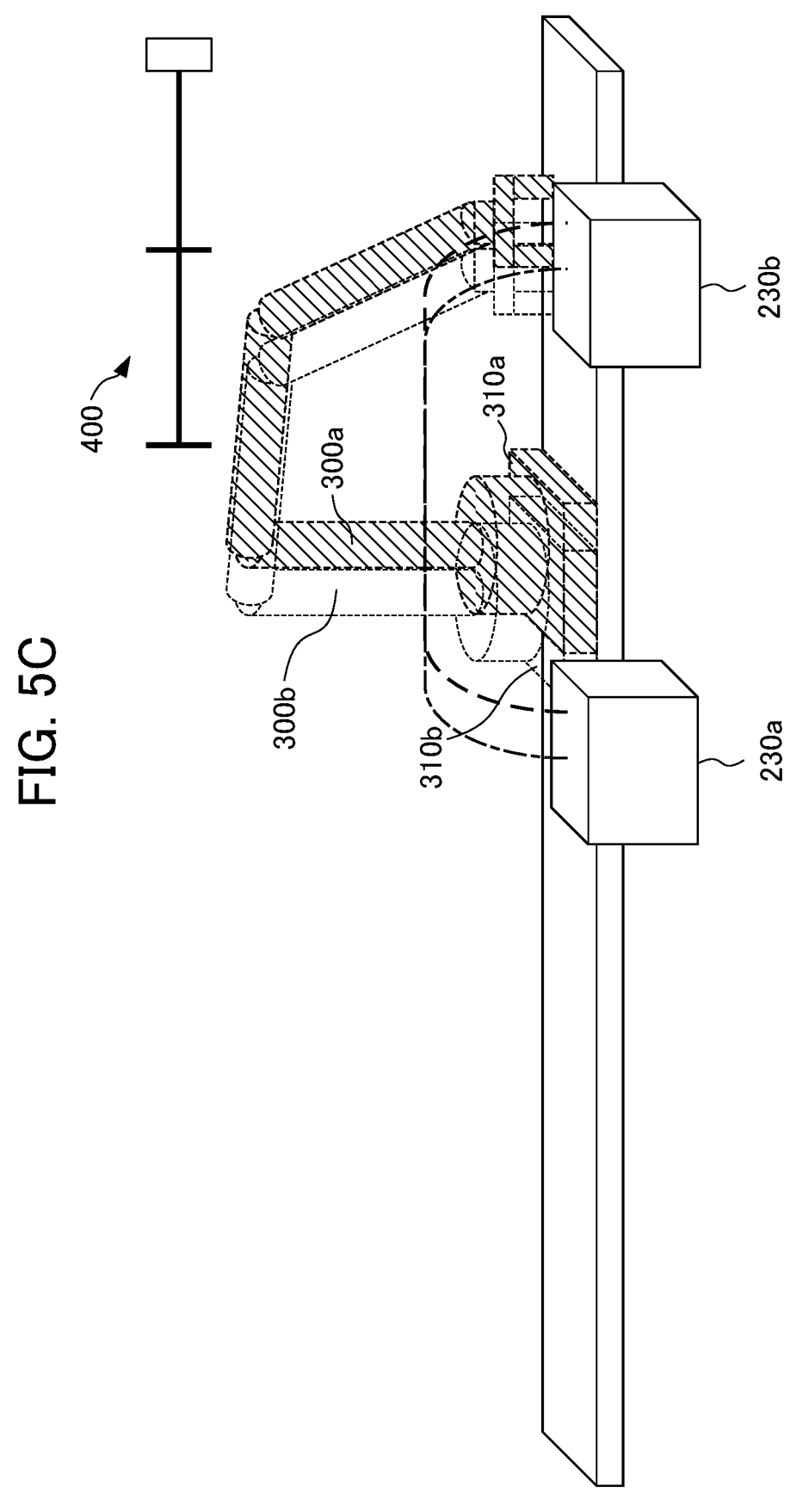
FIG. 5C is a diagram showing the example of the image of the robot system in the case where the simulation execution unit does not perform a simulation of the robot program of interest or another robot program.

(b) Case where the Simulation Execution Unit 103 does not Perform a Simulation of the Robot Program of Interest or Another Robot Program In the case where the simulation execution unit 103 does not perform a simulation of the robot program of interest or another robot program, for example, the motion log playback unit 104 selects two of the plurality of motion logs stored in the motion log storage unit 131 based on an input operation by the user through the input unit 11. As shown in FIGS. 5A to 5C, for example, the motion log playback unit 104 places, in the virtual space, a motion log playback-oriented robot model 300a and a motion log playback-oriented peripheral equipment model 310a, which correspond to one of the selected motion logs, and a motion log playback-oriented robot model 300b and a motion log playback-oriented peripheral equipment model 310b, which correspond to the other motion log. The motion log playback unit 104 displays an image of the robot system shown in FIGS. 5A to 5C on the display unit 12. The motion log playback unit 104 only plays back the selected motion logs. The motion log playback unit 104 may therefore display a slider bar 400 that indicates the progress of the playback as shown in FIGS. 5A to 5C. It should be noted that, as in the case shown in FIGS. 4A to 4C, the positions of the motions of the motion log playback-oriented robot model 300a and the motion log playback-oriented peripheral equipment model 310a corresponding to the one motion log are located toward the positive end of the X-axis compared to those of the motion log playback-oriented robot model 300b and the motion log playback-oriented peripheral equipment model 310b corresponding to the other motion log, and the position (handling position) of the workpiece model 220 in the one motion log is located toward the positive end of the X-axis compared to that in the other motion log as shown in FIGS. 5A to 5C.

In accordance with an operation of the slider bar 400 by the user, for example, the motion log playback unit 104 executes motions of the motion log playback-oriented robot model 300a and the motion log playback-oriented peripheral equipment model 310a, and the motion log playback-oriented robot model 300b and the motion log playback-oriented peripheral equipment model 310b by synchronizing the points in time contained in the selected motion logs.

The above-described configuration enables the robot simulation device 1 to compare, during or after execution of a simulation, motions of the robot or cycle times before and after an adjustment, if any, of a teaching position in a robot program to determine a change therebetween, or motions of the robot or cycle times in a plurality of robot programs that have partially different content to determine a difference therebetween, while also taking into account the peripheral equipment. That is, the above-described configuration makes it possible to compare, in the robot system, motions of the robot or cycle times before and after an adjustment, if any, of a teaching position in a robot program to determine a change therebetween, or motions of the robot or cycle times in a plurality of robot programs that have partially different content to determine a difference therebetween. The user can then select a robot program that allows for optimal motions expected to result in minimizing the cycle time, eliminating unnecessary movements, and avoiding interference between the robot and the peripheral equipment or other equipment.

It should be noted that the motion log playback unit 104 may select three or more motion logs, rather than selecting two motion logs as described above. In this case, the motion log playback unit 104 may place motion log playback-oriented robot models 300 and motion log playback-oriented peripheral equipment models 310 in the virtual space according to the number of selected motion logs.

<Simulation Processing in Robot Simulation Device 1>

The following describes the flow of simulation processing in the robot simulation device 1 with reference to FIG. 6.

FIG. 6 is a flowchart for describing the simulation processing in the robot simulation device 1. The flow shown in FIG. 6 is executed each time a robot motion program is executed.

In Step S1, the virtual space creation unit 101 creates a virtual space representing in three dimensions a work space in which the robot, the peripheral equipment, the workpiece, and the jigs are placed.

In Step S2, the three-dimensional model placement unit 102 places the robot model 200 of the robot, the peripheral equipment model 210 of the rail axis, the workpiece model 220 of the workpiece, and the jig models 230*a* and 230*b* of the jigs in the three-dimensional virtual space created in Step S1.

In Step S3, the simulation execution unit 103 executes motions of the robot model 200 and the peripheral equipment model 210 while performing a simulation of the robot program. The simulation execution unit 103 stores, as a motion log, positions and orientations of the robot model 200 and the peripheral equipment model 210 at different points in time during the simulation of the robot program. The simulation execution unit 103 stores such motion logs in the motion log storage unit 131 on a per-robot program basis.

In Step S4, the motion log playback unit 104 determines whether or not the simulation execution unit 103 performs a simulation of the robot program of interest or another robot program when the motion log is played back. If the simulation execution unit 103 performs a simulation of the robot program of interest or another robot program, the processing continues to Step S5. If the simulation execution unit 103 does not perform a simulation of the robot program of interest or another robot program, the processing continues to Step S7.

In Step S5, the motion log playback unit 104 selects at least one of the plurality of motion logs stored in the motion log storage unit 131 based on an input operation by a user through the input unit 11.

In Step S6, the motion log playback unit 104 places, in the virtual space, a motion log playback-oriented robot model 300 and a motion log playback-oriented peripheral equipment model 310 of the selected motion log together with the robot model 200 and the peripheral equipment model 210 that are placed by the three-dimensional model placement unit 102 and set in motion by the simulation execution unit 103. The motion log playback unit 104 executes motions of the robot model 200 and the peripheral equipment model 210, and the motion log playback-oriented robot model 300 and the motion log playback-oriented peripheral equipment model 310 by synchronizing points in time during the simulation with the points in time contained in the selected motion log.

In Step S7, the motion log playback unit 104 selects at least two of the plurality of motion logs stored in the motion log storage unit 131 based on an input operation by the user through the input unit 11.

In Step S8, the motion log playback unit 104 places, in the virtual space, a motion log playback-oriented robot model 300 and a motion log playback-oriented peripheral equipment model 310 for each motion log. Then, in accordance with an operation of the slider bar 400 by the user, the motion log playback unit 104 executes motions of the motion log playback-oriented robot model 300 and the motion log playback-oriented peripheral equipment model 310 for each motion log by synchronizing the points in time contained in the selected motion logs.

As described above, the robot simulation device 1 according to the foregoing embodiment makes it possible to easily compare, during or after execution of a simulation, motions of a robot or cycle times before and after an adjustment in a robot program to determine a change therebetween, or motions of a robot or cycle times in a plurality of robot programs that have partially different content to determine a difference therebetween.

An embodiment has been described above. However, the robot simulation device 1 is not limited to the embodiment described above, and encompasses changes such as modifications and improvements to the extent that the object of the present invention is achieved.

Modification Example 1

In the embodiment described above, the robot simulation device 1 is a separate device from the robot control device (not shown). However, the present disclosure is not limited as such. For example, the robot control device (not shown) may incorporate the robot simulation device 1.

Modification Example 2

For another example, in the embodiment described above, the robot model 200 in the robot simulation device 1 moves the workpiece model 220 from the jig model 230*a* to the jig model 230*b* along a motion path shown in FIGS. 3A to 3C. However, the present disclosure is not limited as such. For example, the robot simulation device 1 may vary the virtual robot motion parameters, such as a start point, an end point, and a moving speed of the rail axis, and a route and a speed of the tool center point of the robot, and cause the robot model 200 to move the workpiece model 220 from the jig model 230*a* to the jig model 230*b* along various motion paths.

Figure 7A:
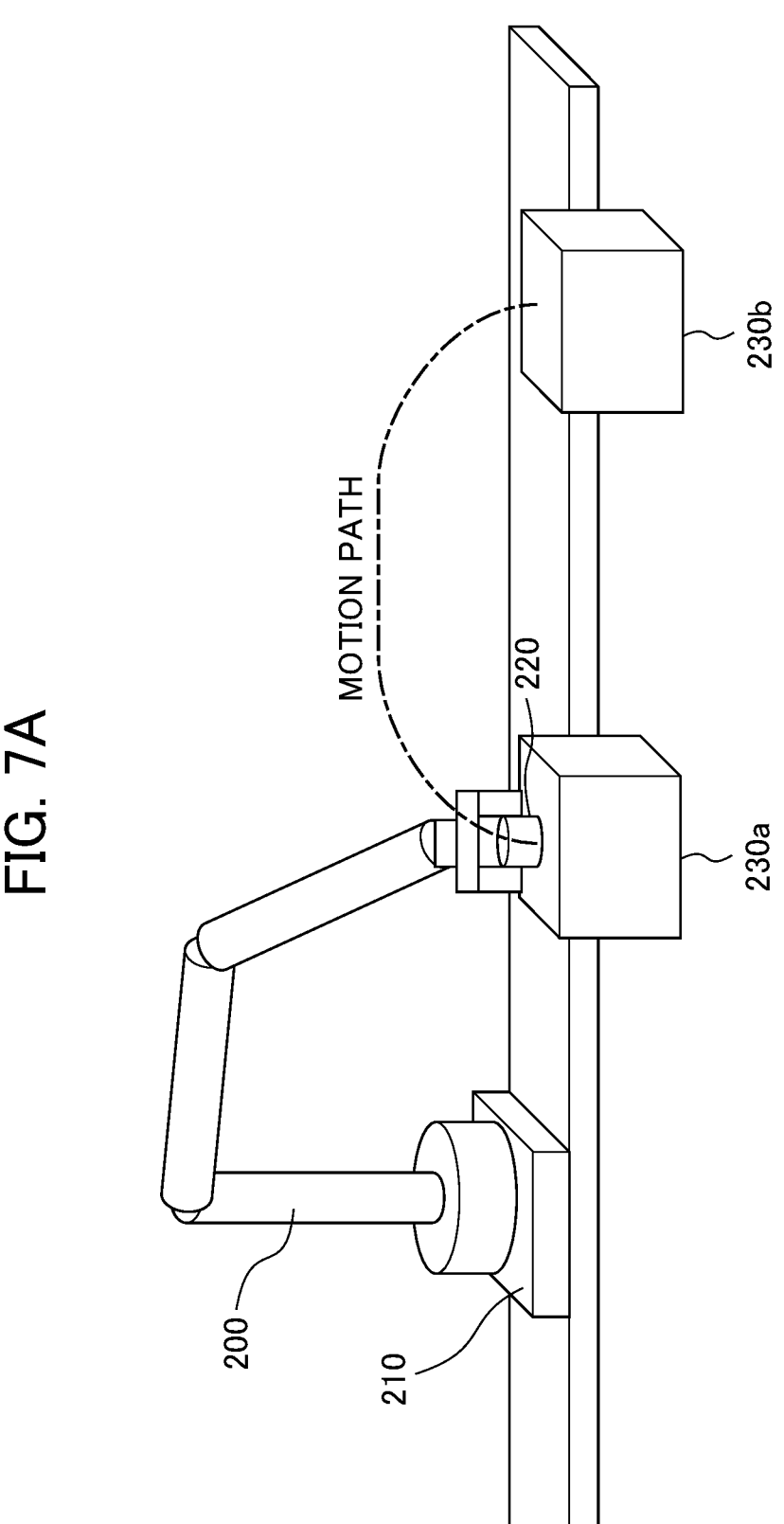
FIG. 7A is a diagram illustrating an example of a motion path that is followed in a case where the robot speed is increased.
Figure 7B:
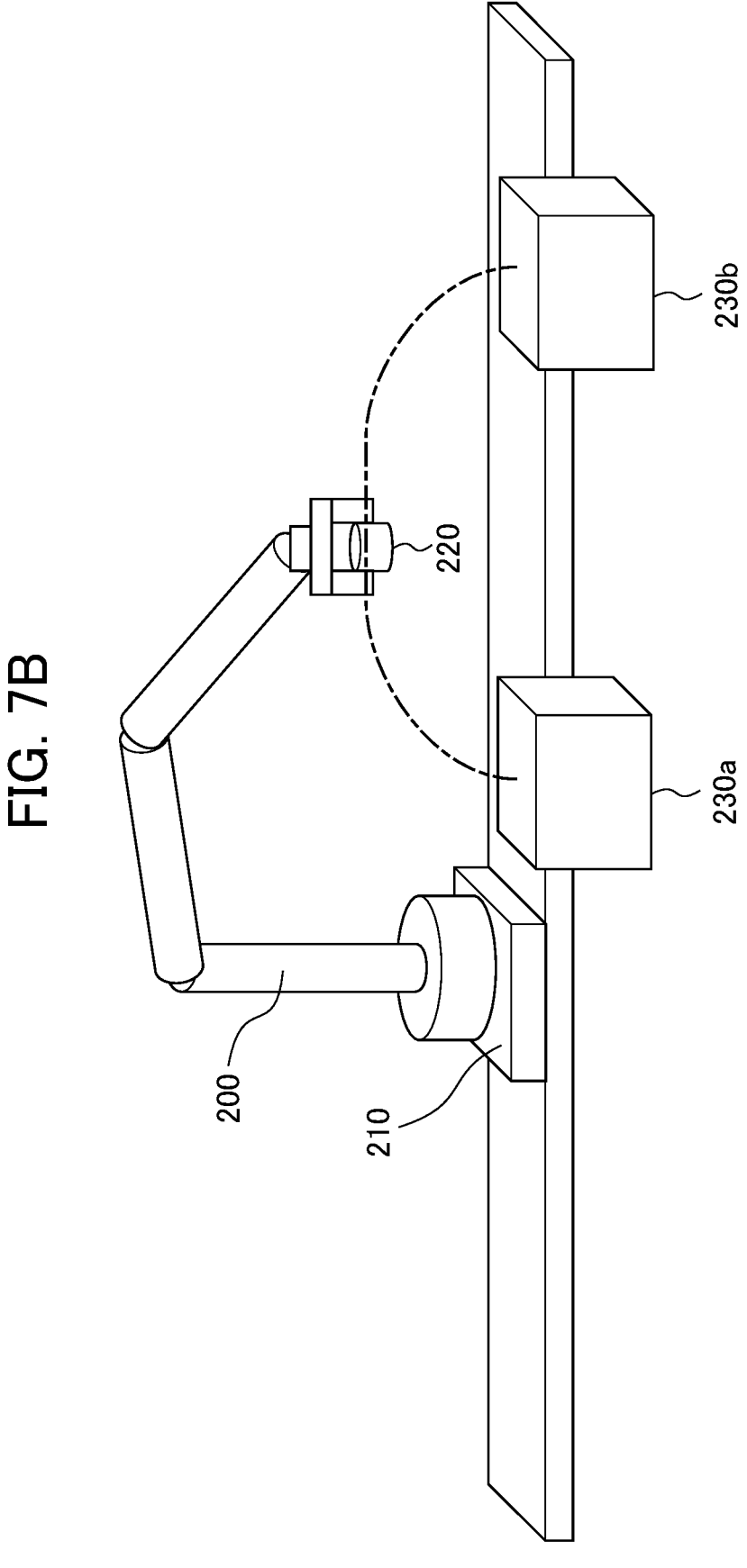
FIG. 7B is a diagram illustrating the example of the motion path that is followed in the case where the robot speed is increased.
Figure 7C:
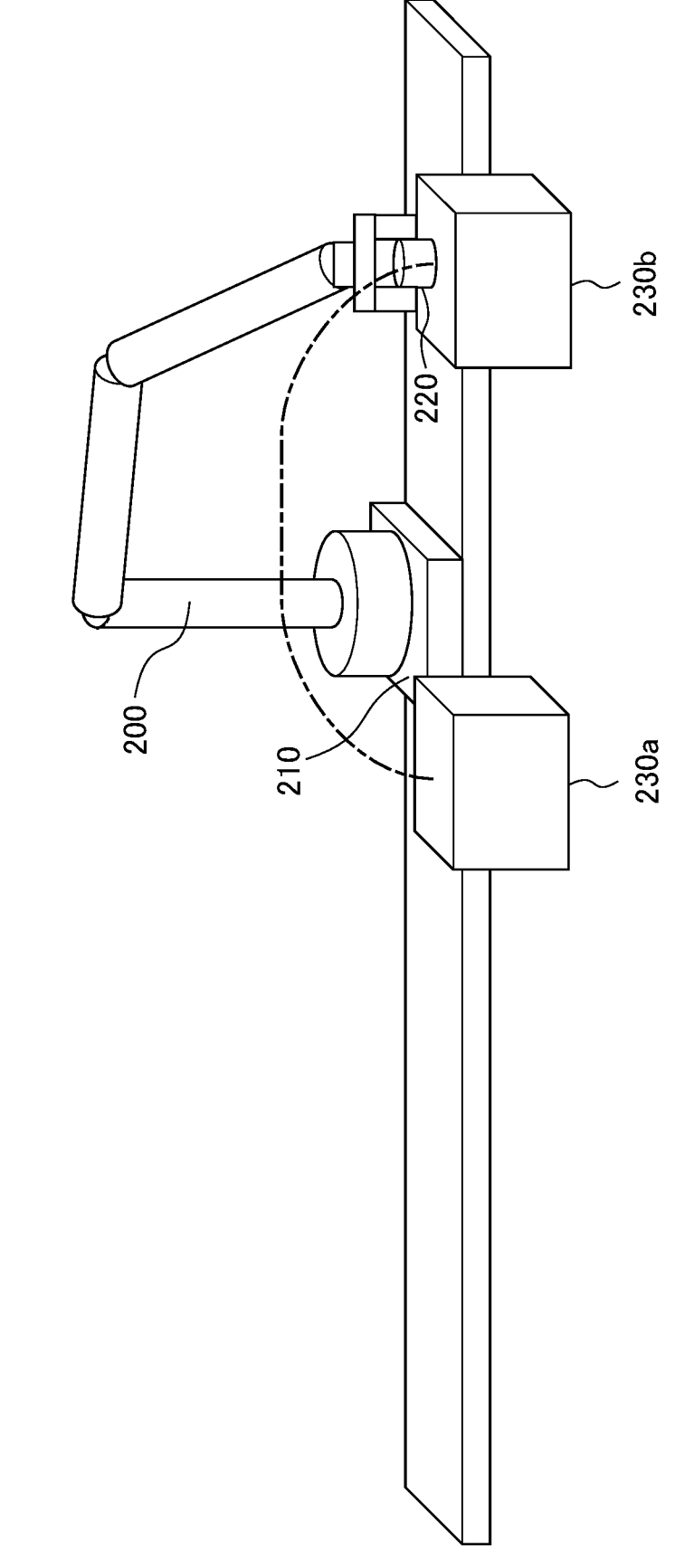
FIG. 7C is a diagram illustrating the example of the motion path that is followed in the case where the robot speed is increased.

FIGS. 7A to 7C are diagrams illustrating an example of a motion path that is followed in a case where the robot speed is increased. As shown in FIGS. 7A to 7C, an increase in the speed of the robot results in a shortening of a section of the motion path where the motion of the robot is smooth.

Figure 8A:
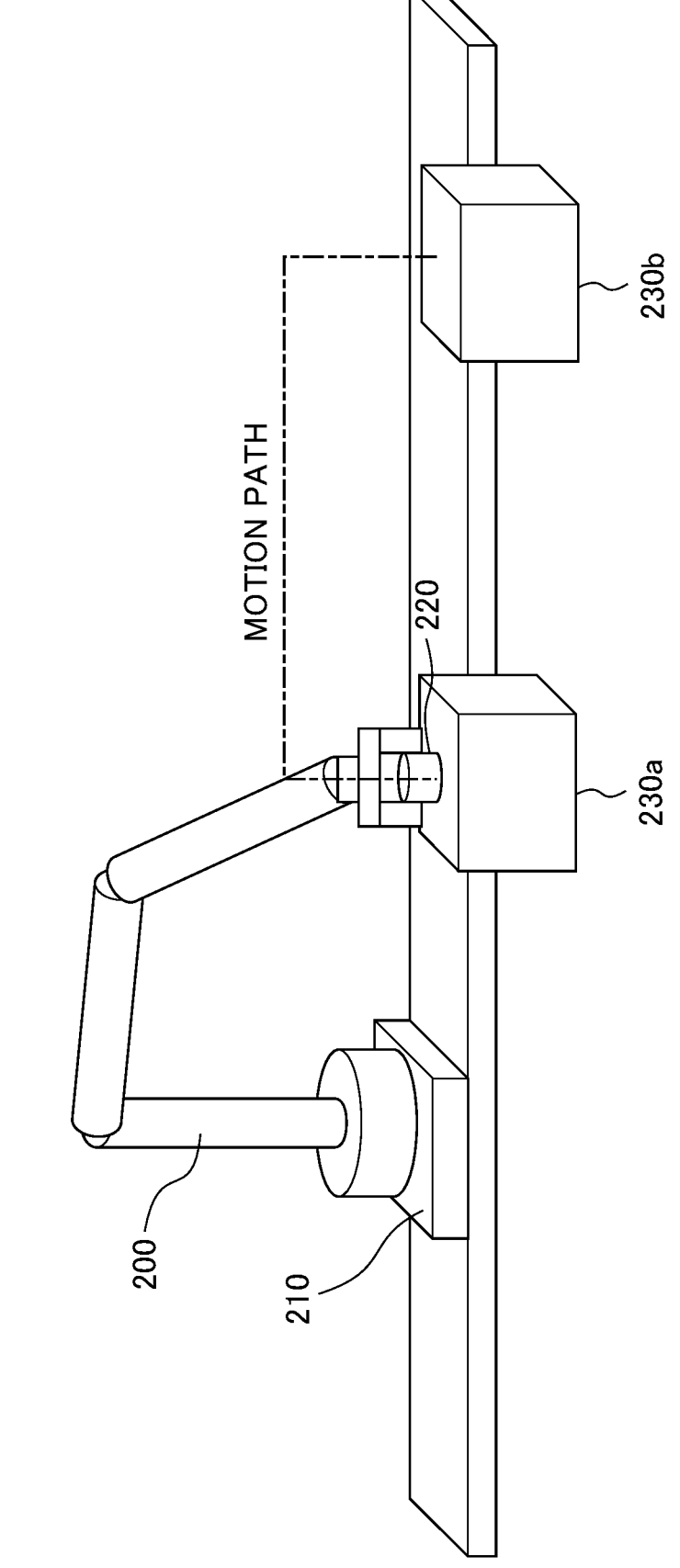
FIG. 8A is a diagram illustrating an example of a motion path that is followed in a case where positions of the robot are established in all sections of the motion path.
Figure 8B:
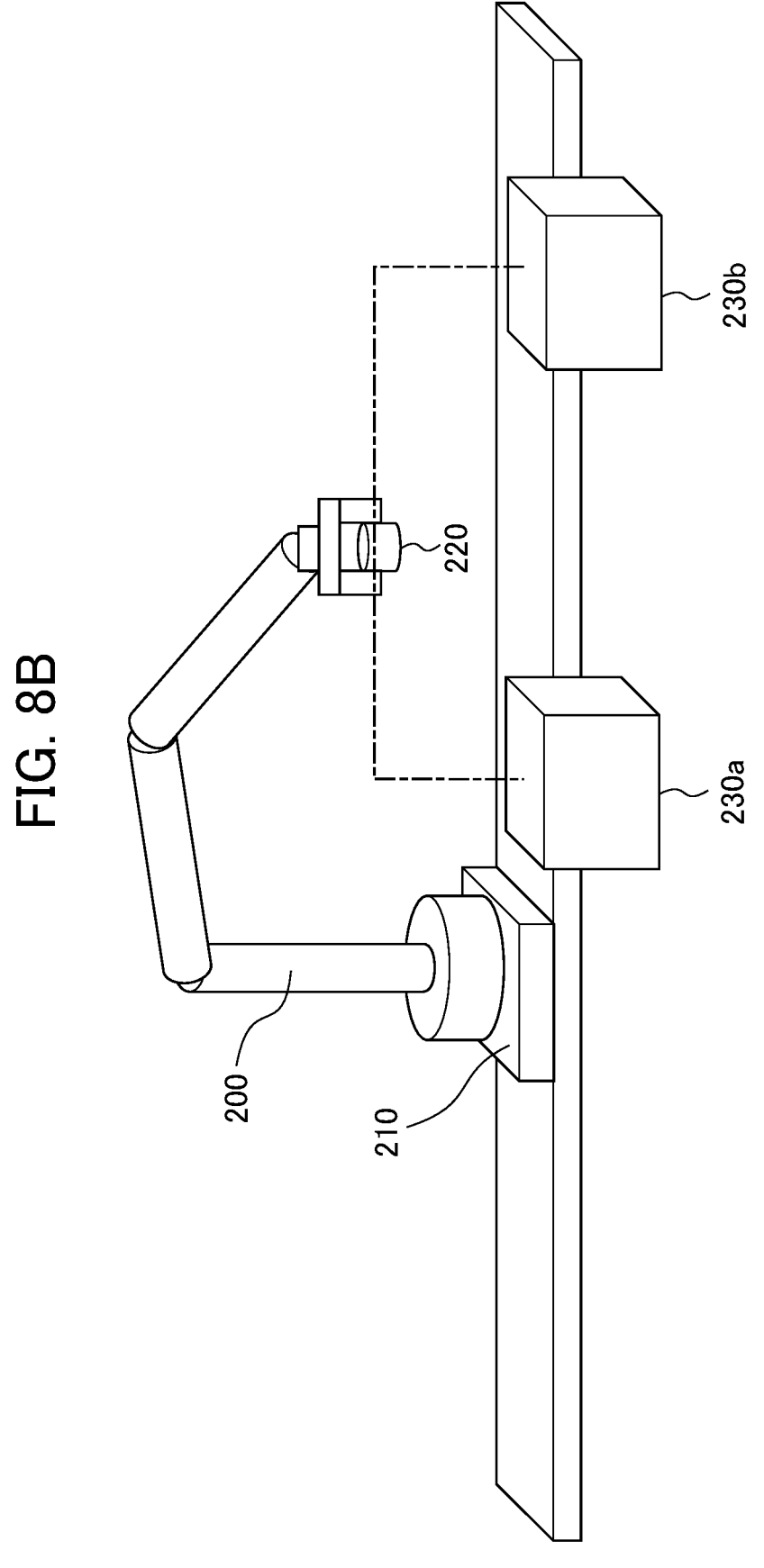
FIG. 8B is a diagram illustrating the example of the motion path that is followed in the case where positions of the robot are established in all the sections of the motion path.
Figure 8C:
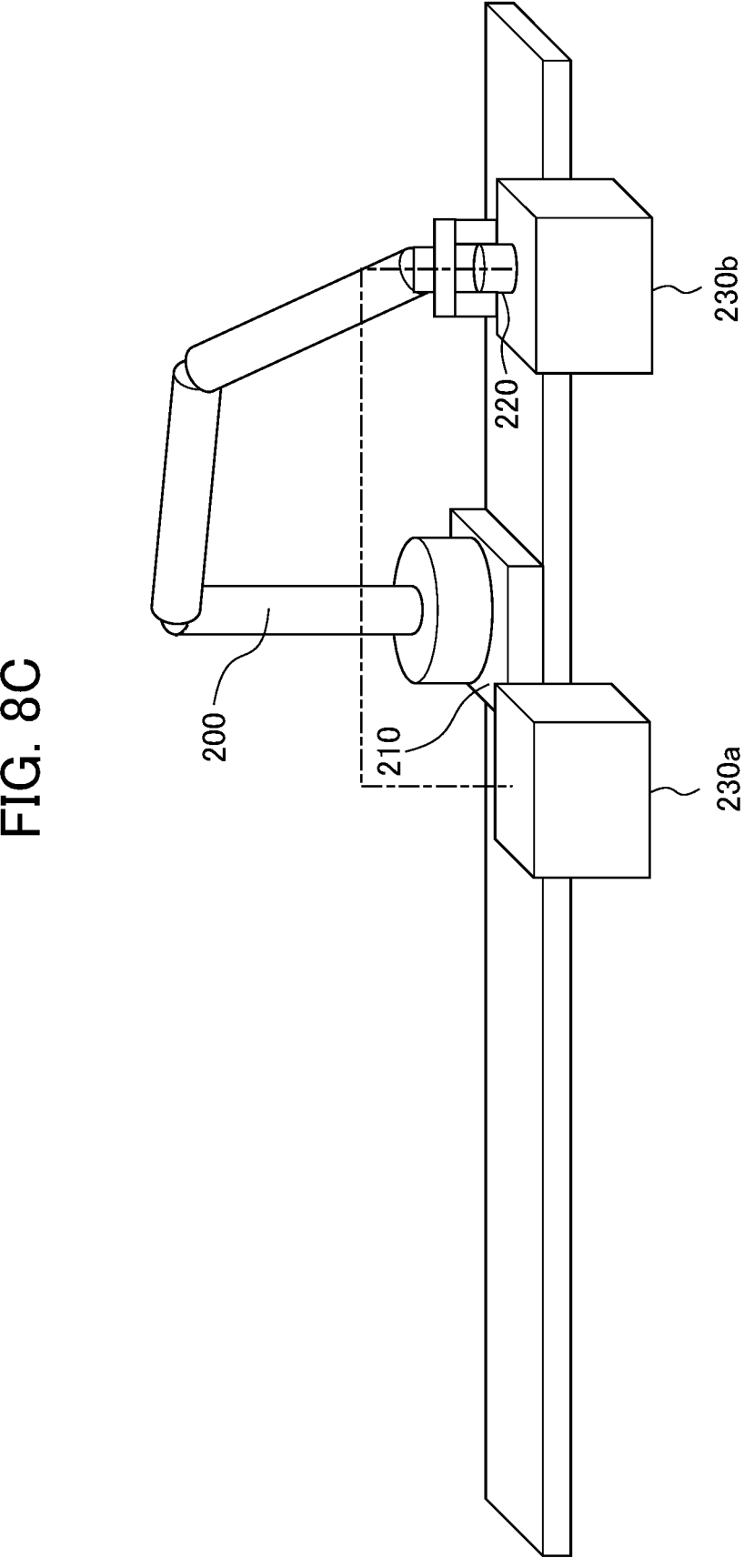
FIG. 8C is a diagram illustrating the example of the motion path that is followed in the case where positions of the robot are established in all the sections of the motion path.

FIGS. 8A to 8C are diagrams illustrating an example of a motion path that is followed in a case where positions of the robot are established in all sections of the motion path. As shown in FIGS. 8A to 8C, the robot in motion adheres to the established positions in each section.

Figure 9A:
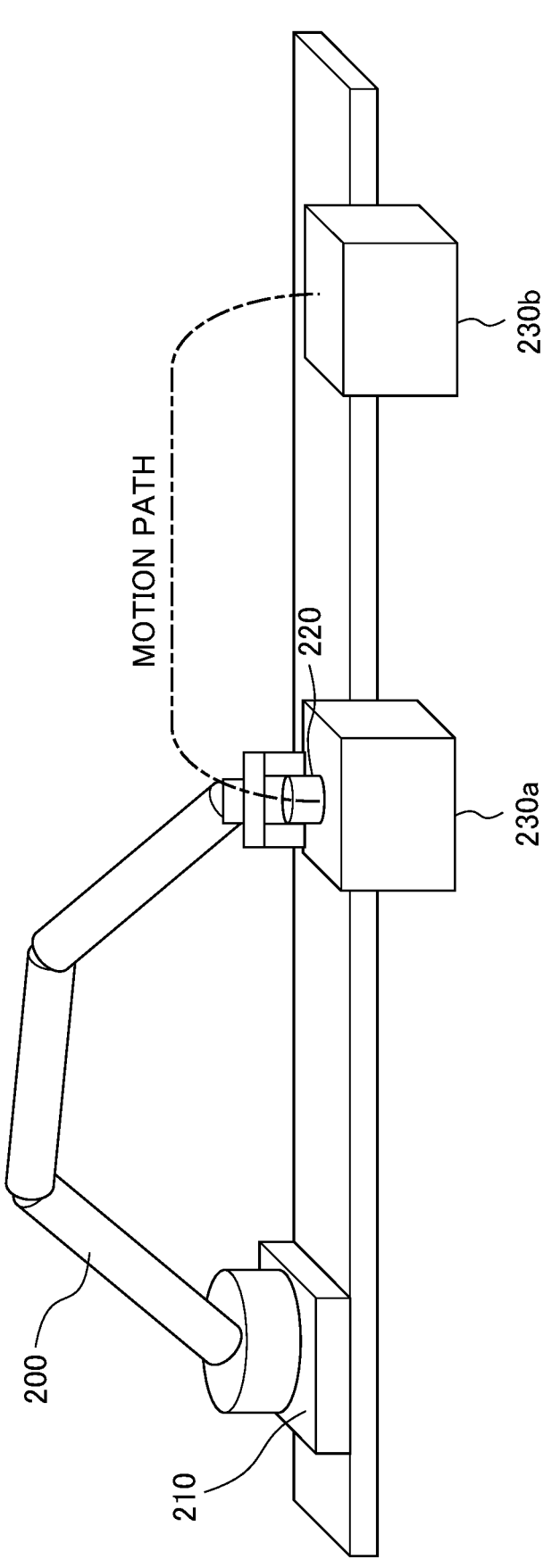
FIG. 9A is a diagram illustrating an example of a motion path that is followed in a case where the start point and the end point of a rail axis are changed.
Figure 9B:
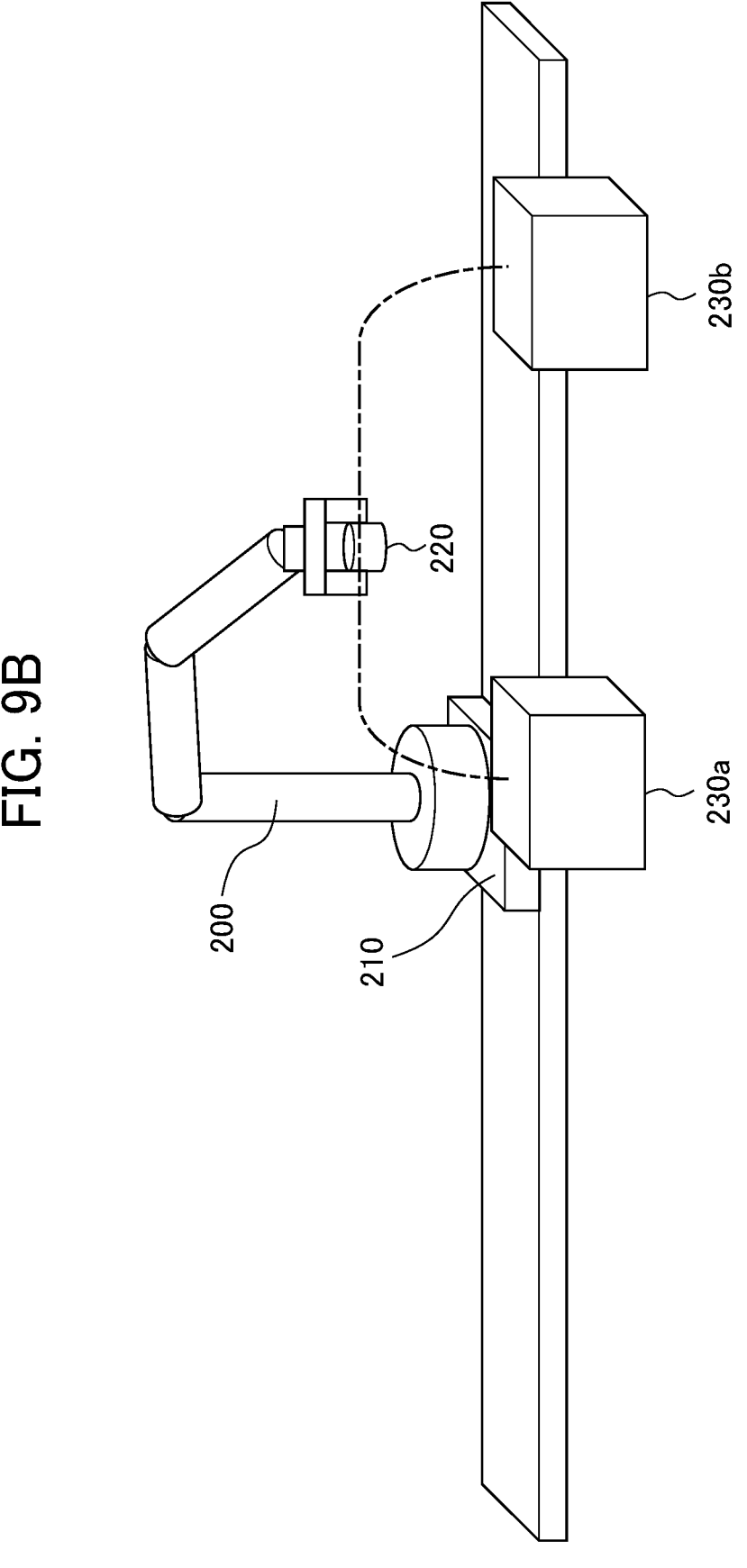
FIG. 9B is a diagram illustrating the example of the motion path that is followed in the case where the start point and the end point of the rail axis are changed.
Figure 9C:
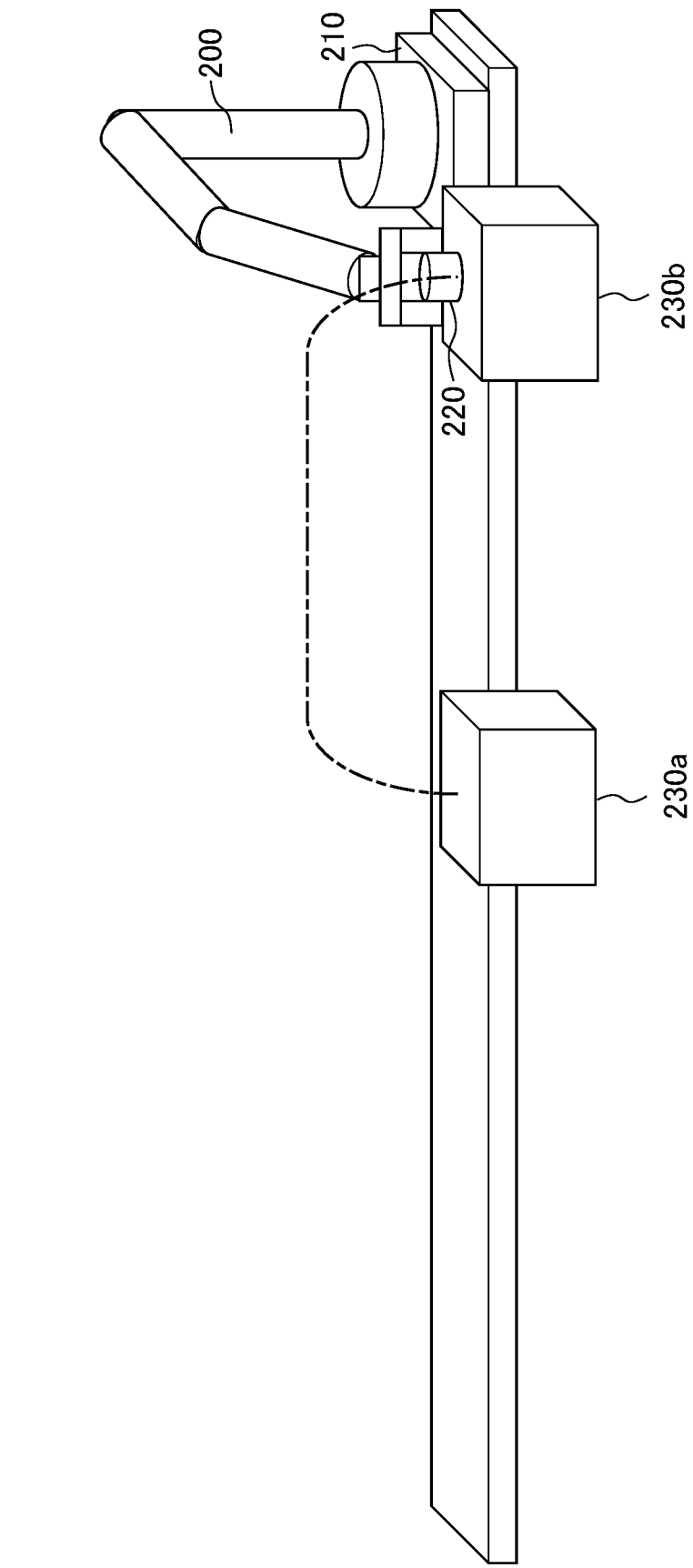
FIG. 9C is a diagram illustrating the example of the motion path that is followed in the case where the start point and the end point of the rail axis are changed.

FIGS. 9A to 9C are diagrams illustrating an example of a motion path that is followed in a case where the start point and the end point of the rail axis are changed.

As shown in FIGS. 9A to 9C, changing the start point and the end point of the rail axis causes changes in speed of the rail axis even if the tool center point of the robot follows the same motion path.

It should be noted that each of the functions included in the robot simulation device 1 according to the foregoing embodiment can be implemented by hardware, software, or a combination thereof. Being implemented by software herein means being implemented through a computer reading and executing a program.

The programs can be supplied to the computer by being stored on any of various types of non-transitory computer readable media. The non-transitory computer readable media include various types of tangible storage media. Examples of non-transitory computer readable media include magnetic storage media (such as flexible disks, magnetic tape, and hard disk drives), magneto-optical storage media (such as magneto-optical disks), compact disc read only memory (CD-ROM), compact disc recordable (CD-R), compact disc rewritable (CD-R/W), and semiconductor memory (such as mask ROM, programmable ROM (PROM), erasable PROM (EPROM), flash ROM, and RAM). Alternatively, the programs may be supplied to the computer using any of various types of transitory computer readable media. Examples of transitory computer readable media include electrical signals, optical signals, and electromagnetic waves. Such transitory computer readable media are able to supply the programs to the computer through a wireless communication channel or a wired communication channel such as electrical wires or optical fibers.

It should be noted that writing the programs to be recorded on a storage medium includes processes that are not necessarily performed chronologically and that may be performed in parallel or individually as well as processes that are performed chronologically according to the order thereof.

To put the foregoing into other words, the robot simulation device according to the present disclosure can take various embodiments having the following configurations.

(1) A robot simulation device 1 according to the present disclosure is a robot simulation device for performing a simulation of a robot program in a robot system including a robot, the robot simulation device including: a three-dimensional model placement unit 102 configured to place, in a virtual space, a robot model 200 representing the robot in three dimensions; a simulation execution unit 103 configured to execute a motion of the robot model 200 while performing a simulation of the robot program; a motion log storage unit 131 configured to store, as a motion log, positions and orientations of the robot model 200 at different points in time during the simulation of the robot program; and a motion log playback unit 104 configured to select at least one of the plurality of motion logs stored in the motion log storage unit 131, additionally place a motion log playback-oriented robot model 300 in the virtual space, and execute a motion of the motion log playback-oriented robot model 300 based on the points in time contained in the selected motion log, the motion log playback-oriented robot model 300 representing the robot in three dimensions.

According to the robot simulation device 1, it is possible to easily compare, during or after execution of a simulation, motions of a robot or cycle times before and after an adjustment in a robot program to determine a change therebetween, or motions of a robot or cycle times in a plurality of robot programs that have partially different content to determine a difference therebetween.

(2) In the robot simulation device 1 described in (1), in a case where the simulation execution unit 103 performs a simulation of the robot program or another robot program, the motion log playback unit 104 may execute a motion of the motion log playback-oriented robot model 300 by synchronizing points in time during the simulation with the points in time contained in the selected motion log.

The above-described configuration enables the robot simulation device 1 to compare, during execution of a simulation, motions of the robot or cycle times before and after an adjustment, if any, of a teaching position or the like in a robot program to determine a change therebetween, or motions of the robot or cycle times in a plurality of robot programs that have partially different content to determine a difference therebetween.

(3) In the robot simulation device 1 described in (1) or (2), the robot system may further include peripheral equipment, the three-dimensional model placement unit 102 may additionally place a peripheral equipment model 210 in the virtual space, the peripheral equipment model 210 representing the peripheral equipment in three dimensions, the simulation execution unit 103 may additionally cause a motion of the peripheral equipment model 210 while performing the simulation of the robot program, the motion log storage unit 131 may additionally store, as the motion log, positions and orientations of the peripheral equipment model 210 at different points in time during the simulation of the robot program; and the motion log playback unit 104 may additionally place a motion log playback-oriented peripheral equipment model 310 in the virtual space, and execute motions of the motion log playback-oriented robot model 300 and the motion log playback-oriented peripheral equipment model 310 based on the points in time contained in the selected motion log, the motion log playback-oriented peripheral equipment model 310 representing the peripheral equipment in three dimensions.

The above-described configuration enables the robot simulation device 1 to compare, during execution of a simulation, motions of the robot or cycle times before and after an adjustment, if any, of a teaching position or the like in a robot program to determine a change therebetween, or motions of the robot or cycle times in a plurality of robot programs that have partially different content to determine a difference therebetween, while also taking into account the peripheral equipment.

EXPLANATION OF REFERENCE NUMERALS

1: Robot simulation device
10: Control unit
101: Virtual space creation unit
102: Three-dimensional model placement unit
103: Simulation execution unit
104: Motion log playback unit
11: Input unit
12: Display unit
13: Storage unit
131: Motion log storage unit
132: Model storage unit
The invention claimed is:
1. A robot simulation device for performing a simulation of a plurality of robot programs pertaining to a robot, the robot simulation device comprising:
a three-dimensional model placement unit configured to place, in a virtual space, one robot model representing the robot in three dimensions;
a simulation execution unit configured to execute a motion of the one robot model while performing a simulation of at least one robot program included in the plurality of robot programs;
a motion log storage unit configured to store, as a motion log, positions and orientations of the one robot model at different points in time during the simulation of the at least one robot program for each of the plurality of robot programs; and
a motion log playback unit configured to select at least one of a plurality of the motion logs stored in the motion log storage unit, additionally place a motion log playback-oriented robot model in the virtual space, and execute a motion of the motion log playback-oriented robot model based on the points in time contained in the selected motion log, the motion log playback-oriented robot model representing the robot in three dimensions, wherein in a case where the simulation execution unit performs a simulation of the at least one robot program, the at least one robot program after adjustment, or another robot program, the motion log playback unit executes a motion of the motion log playback-oriented robot model by synchronizing points in time during the simulation with the points in time contained in the selected motion log.

2. The robot simulation device according to claim 1, wherein the robot system further includes peripheral equipment, the three-dimensional model placement unit additionally places a peripheral equipment model in the virtual space, the peripheral equipment model representing the peripheral equipment in three dimensions,

14 the simulation execution unit additionally causes a motion of the peripheral equipment model while performing the simulation of the robot program, the motion log storage unit additionally stores, as a motion log, positions and orientations of the peripheral equipment model at different points in time during the simulation of the robot program; and the motion log playback unit additionally places a motion log playback-oriented peripheral equipment model in the virtual space, and executes motions of the motion log playback-oriented robot model and the motion log playback-oriented peripheral equipment model based on the points in time contained in the selected motion log, the motion log playback-oriented peripheral equipment model representing the peripheral equipment in three dimensions.

* * * * *